=

US009460718B2

(12) United States Patent
Ashikawa et al.

(10) Patent No.: US 9,460,718 B2
(45) Date of Patent: Oct. 4, 2016

(54) TEXT GENERATOR, TEXT GENERATING METHOD, AND COMPUTER PROGRAM PRODUCT

(71) Applicant: KABUSHIKI KAISHA TOSHIBA, Minato-ku, Tokyo (JP)

(72) Inventors: Taira Ashikawa, Kawasaki (JP); Osamu Nishiyama, Yokohama (JP); Tomoo Ikeda, Tokyo (JP); Koji Ueno, Mishima (JP); Kouta Nakata, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 150 days.

(21) Appl. No.: 14/206,178

(22) Filed: Mar. 12, 2014

(65) Prior Publication Data
US 2014/0303974 A1 Oct. 9, 2014

(30) Foreign Application Priority Data

Apr. 3, 2013 (JP) .................................. 2013-077576

(51) Int. Cl.
*G10L 15/26* (2006.01)
*G10L 15/22* (2006.01)
*G10L 15/01* (2013.01)

(52) U.S. Cl.
CPC ................ *G10L 15/26* (2013.01); *G10L 15/01* (2013.01); *G10L 2015/226* (2013.01)

(58) Field of Classification Search
USPC ........................................................ 704/231
See application file for complete search history.

(56) References Cited

U.S. PATENT DOCUMENTS

| 8,204,746 | B2* | 6/2012 | Odinak | G10L 15/30 704/235 |
| 2002/0178002 | A1* | 11/2002 | Boguraev | G06F 17/277 704/235 |
| 2005/0080633 | A1* | 4/2005 | Lueck | G10L 15/22 704/278 |
| 2006/0026003 | A1* | 2/2006 | Carus | G10L 15/22 704/275 |
| 2006/0195318 | A1* | 8/2006 | Stanglmayr | G10L 15/26 704/235 |
| 2007/0208567 | A1* | 9/2007 | Amento | G10L 15/22 704/270 |
| 2009/0125299 | A1* | 5/2009 | Wang | G10L 15/22 704/201 |

(Continued)

FOREIGN PATENT DOCUMENTS

JP 2007-108407 4/2007

OTHER PUBLICATIONS

U.S. Appl. No. 13/960,232 of Nishiyama et al filed Aug. 6, 2013.

*Primary Examiner* — Douglas Godbold
(74) *Attorney, Agent, or Firm* — Nixon & Vanderhye, P.C.

(57) ABSTRACT

According to an embodiment, a text generator includes a recognizer, a selector, and a generation unit. The recognizer is configured to recognize an acquired sound and obtain recognized character strings in recognition units and confidence levels of the recognized character strings. The selector is configured to select at least one of the recognized character strings used for a transcribed sentence on the basis of at least one of a parameter about transcription accuracy and a parameter about a workload needed for transcription. The generation unit is configured to generate the transcribed sentence using the selected recognized character strings.

4 Claims, 23 Drawing Sheets

(56) References Cited

U.S. PATENT DOCUMENTS

| | | | |
|---|---|---|---|
| 2009/0228274 A1* | 9/2009 | Terrell, II | G10L 15/22 704/235 |
| 2009/0234648 A1* | 9/2009 | Nagatomo | G10L 15/22 704/235 |
| 2009/0248412 A1* | 10/2009 | Washio | H04M 3/4936 704/246 |
| 2009/0276215 A1* | 11/2009 | Hager | G06F 17/273 704/235 |
| 2010/0250250 A1* | 9/2010 | Wiggs | G10L 15/32 704/235 |
| 2011/0022387 A1* | 1/2011 | Hager | G06Q 10/107 704/235 |
| 2013/0018655 A1* | 1/2013 | Terrell, II | G10L 15/22 704/235 |
| 2013/0030794 A1* | 1/2013 | Ikeda | G10L 21/028 704/9 |
| 2013/0030805 A1* | 1/2013 | Suzuki | G10L 15/26 704/235 |
| 2013/0030806 A1* | 1/2013 | Ueno | G10L 15/26 704/235 |
| 2013/0035936 A1* | 2/2013 | Garland | G10L 15/26 704/235 |
| 2013/0035937 A1* | 2/2013 | Webb | H04M 3/53333 704/235 |
| 2013/0080163 A1 | 3/2013 | Shimogori et al. | |
| 2013/0124984 A1* | 5/2013 | Kuspa | H04N 9/475 715/255 |
| 2013/0138637 A1* | 5/2013 | Bachtiger | G06F 17/30023 707/723 |
| 2013/0197909 A1* | 8/2013 | Hager | G06F 17/273 704/235 |
| 2013/0297291 A1* | 11/2013 | Bostick | G10L 15/01 704/9 |
| 2013/0317818 A1* | 11/2013 | Bigham | G10L 15/26 704/235 |
| 2014/0046666 A1 | 2/2014 | Nishiyama et al. | |
| 2014/0067390 A1* | 3/2014 | Webb | H04M 3/53333 704/235 |
| 2014/0081641 A1* | 3/2014 | Longe | G10L 15/24 704/257 |
| 2014/0136199 A1* | 5/2014 | Hager | G06Q 10/107 704/235 |
| 2014/0195238 A1* | 7/2014 | Terao | G10L 15/02 704/251 |

* cited by examiner

| RECOGNITION ID | RECOGNIZED CHARACTER STRING | CONFIDENCE LEVEL |
|---|---|---|
| 1 | KONNICHIWA, | 100 |
| 2 | ABC | 20 |
| 3 | KAISHA | 80 |
| 4 | NO | 80 |
| 5 | TARO | 50 |
| 6 | DESU. | 80 |

D2

| RECOGNI-TION ID | RECOGNIZED CHARACTER STRING | CONFI-DENCE LEVEL | TRANSCRIPTION ACCURACY | SELECTION RESULT |
|---|---|---|---|---|
| 1 | KONNICHIWA, | 100 | 5 | SELECTED |
| 2 | ABC | 20 | 1 | NOT-SELECTED |
| 3 | KAISHA | 80 | 4 | SELECTED |
| 4 | NO | 80 | 4 | SELECTED |
| 5 | TARO | 50 | 2.5 | NOT-SELECTED |
| 6 | DESU. | 80 | 4 | SELECTED |

D2

| RECOGNI-TION ID | RECOGNIZED CHARACTER STRING | CONFI-DENCE LEVEL | WORK TIME [SECOND] | ACCUMU-LATED WORK TIME | SELECTION RESULT |
|---|---|---|---|---|---|
| 1 | KONNICHIWA, | 100 | 2 | 00:00:02 | SELECTED |
| 3 | KAISHA | 80 | 2 | 00:00:04 | SELECTED |
| 4 | NO | 80 | 1 | 00:00:05 | SELECTED |
| 6 | DESU. | 80 | 2 | 00:00:07 | SELECTED |
| 5 | TARO | 50 | 2 | 00:00:09 | NOT-SELECTED |
| 2 | ABC | 20 | 2 | 00:00:11 | NOT-SELECTED |

D2

| RECOGNI-TION ID | RECOGNIZED CHARACTER STRING | CONFI-DENCE LEVEL | WORK COST | ACCUMU-LATED WORK COST | SELECTION RESULT |
|---|---|---|---|---|---|
| 1 | KONNICHIWA, | 100 | 20 | 20 | SELECTED |
| 3 | KAISHA | 80 | 20 | 40 | SELECTED |
| 4 | NO | 80 | 10 | 50 | SELECTED |
| 6 | DESU. | 80 | 20 | 70 | SELECTED |
| 5 | TARO | 50 | 20 | 90 | NOT-SELECTED |
| 2 | ABC | 20 | 20 | 110 | NOT-SELECTED |

FIG.15

```
<div class="hatugen">
 <span id="1" class="selected">KONNICHIWA,</span>
 <span id="2" class="not_selected">ABC</span>
 <span id="3" class="selected">KAISHA</span>
 <span id="4" class="selected">NO</span>
 <span id="5" class="not_selected">TARO</span>
 <span id="6" class="selected">DESU.</span>
 <span id="7" class="selected">HONJITU</span>
 <span id="8" class="selected">WA,</span>
 <span id="9" class="selected">OKOSHI</span>
 <span id="10" class="selected">ITADAKI</span>
 <span id="11" class="selected">ARIGATOU</span>
 <span id="12" class="selected">GOZAIMASU.</span>
 <span id="13" class="selected">HONJITU</span>
 <span id="14" class="selected">NO</span>
 <span id="15" class="selected">GIDAI</span>
 <span id="16" class="selected">HA,</span>
 <span id="17" class="not_selected">DEF</span>
 <span id="18" class="selected">KAISHA</span>
 <span id="19" class="selected">NO</span>
 <span id="20" class="not_selected">GHI</span>
 <span id="21" class="selected">TOIU</span>
 <span id="22" class="selected">SEIHIN</span>
 <span id="23" class="selected">NI</span>
 <span id="24" class="selected">TUITE</span>
 <span id="25" class="selected">DESU.</span>
</div>
```

FIG.16

| CONTENT OF UTTERANCE |
|---|
| KONNICHIWA, <u>ABC</u> KAISHA NO <u>TARO</u> DESU. ····HONJITU NO GIDAI HA, <u>DEF</u> KAISHA NO <u>GHI</u> TOIU SEIHIN NI TUITE DESU. |

(A)

| CONTENT OF UTTERANCE |
|---|
| KONNICHIWA, ABC KAISHA NO TARO DESU. ····HONJITU NO GIDAI HA, DEF KAISHA NO GHI TOIU SEIHIN NI TUITE DESU. |

(B)

| CONTENT OF UTTERANCE |
|---|
| KONNICHIWA, ABC KAISHA NO TARO DESU. ····HONJITU NO GIDAI HA, DEF KAISHA NO GHI TOIU SEIHIN NI TUITE DESU. |

(C)

| CONTENT OF UTTERANCE |
|---|
| KONNICHIWA, ●●● KAISHA NO ●● DESU. ····HONJITU NO GIDAI HA, ●●● KAISHA NO ●●● TOIU SEIHIN NI TUITE DESU. |

| UTTERANCE ID | UTTERANCE START TIME | UTTERER ID |
|---|---|---|
| 1 | 00:00:02 | TARO |
| 2 | 00:00:04 | JIRO |
| 3 | 00:00:08 | SABURO |
| 4 | 00:01:00 | TARO |

TEXT GENERATOR, TEXT GENERATING METHOD, AND COMPUTER PROGRAM PRODUCT

CROSS-REFERENCE TO RELATED APPLICATIONS

This application is based upon and claims the benefit of priority from Japanese Patent Application No. 2013-077576, filed on Apr. 3, 2013; the entire contents of which are incorporated herein by reference.

FIELD

Embodiments described herein relate generally to a text generator, a text generating method, and a computer program.

BACKGROUND

In transcription work, one transcribes the contents of speeches into sentences (into text) while listening to recorded sound data, for example. In order to reduce a burden in the transcription work, apparatuses for assisting transcription work have been known that use speech recognition systems.

The known apparatuses, however, cannot obtain appropriate speech recognition results that operators desire, and thus cannot reduce the burden in the transcription work.

BRIEF DESCRIPTION OF THE DRAWINGS

FIG. 4 is an exemplary schematic diagram illustrating data of a speech recognition result according to the first embodiment;

FIG. 15 is an exemplary schematic diagram illustrating a data format of the transcribed sentence according to the first embodiment;

FIG. 16 is an exemplary schematic diagram illustrating displays of the transcribed sentence according to the first embodiment;

FIG. 24 is an exemplary schematic diagram illustrating data of utterance period information according to the third embodiment;

DETAILED DESCRIPTION

Figure 1:
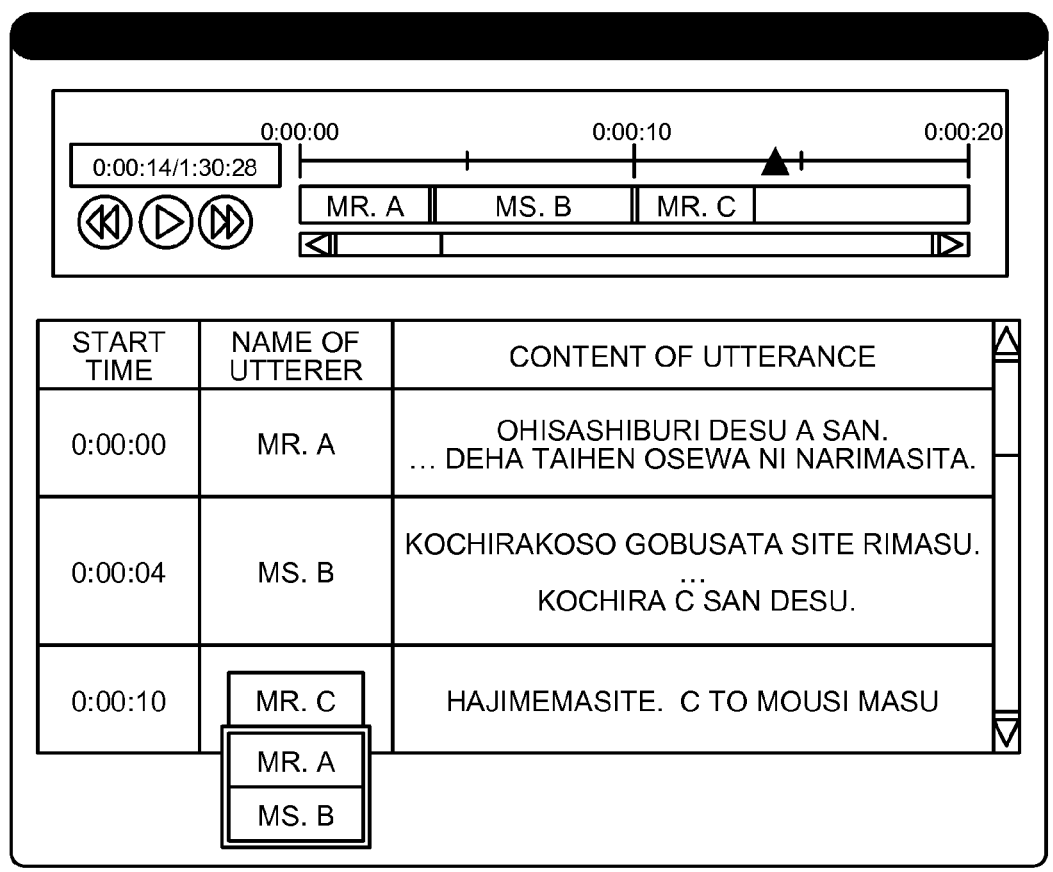
FIG. 1 is an exemplary schematic diagram illustrating a usage of a text generator according to a first embodiment.

According to an embodiment, a text generator includes a recognizer, a selector, and a generation unit. The recognizer is configured to recognize an acquired sound and obtain recognized character strings in recognition units, and confidence levels of the respective recognition character strings. The selector is configured to select at least one of the recognized character strings used for a transcribed sentence on the basis of at least one of a parameter about transcription accuracy and a parameter about a workload needed for transcription. The generation unit is configured to generate the transcribed sentence using the selected recognized character string.

Embodiments of a text generator, a text generating method, and a computer program will be described below in detail with reference to the accompanying drawings.

First Embodiment

Overview

The following describes a function of a text generator (hereinafter referred to as the "text generating function") according to a first embodiment. The text generator according to the first embodiment selects recognized character strings used for a transcribed sentence on the basis of confidence levels of the recognized character strings calculated based on a speech recognition result and a parameter about transcription accuracy. Alternatively, the text generator according to the embodiment selects the recognized character strings used for a transcribed sentence on the basis of the confidence levels of the recognized character strings calculated based on the speech recognition result and a parameter about a workload needed for transcription. As a result, the text generator according to the embodiment generates the transcribed sentence from the selected recognized character strings. The text generator according to the embodiment thus enables the transcription work using an appropriate speech recognition result. The text generator according to the embodiment has such a text generating function.

An example of the conventional apparatuses overlooks a speech recognition result based on sound data. This apparatus obtains a priority of the speech recognition result on the basis of a confidence level and an importance level of a recognized word and formats output information about the speech recognition result in accordance with the priority. Such a conventional apparatus, however, allows an operator only to adjust output by designating a display target range. The conventional apparatus outputs insufficiently the appropriate speech recognition result that an operator desires in accordance with the transcription accuracy or the workload needed for transcription, thereby increasing a burden placed on the operator in the transcription work. As described above, the conventional apparatus does not reduce the burden placed on an operator in the transcription work.

The text generator according to the embodiment adjusts the output of the speech recognition result in accordance with a work condition (the transcription accuracy or the workload needed for transcription) designated by an operator. When the operator performs addition or correction on the adjusted output, the text generator in the embodiment allows the operator to perform the transcription work by synchronizing an input character with a sound using the speech recognition result.

As a result, the text generator according to the embodiment enables using in the transcription work an appropriate speech recognition result according to the work condition such as the transcription accuracy or the workload needed for transcription, thereby making it possible to readily add characters to or correct characters of the speech recognition result. Consequently, the text generator according to the embodiment can reduce the burden placed on the operator in the transcription work.

The text generator according to the embodiment can provide the following services, for example. FIG. 1 is a schematic diagram illustrating a usage example of the text generator according to the embodiment. FIG. 1 illustrates an example in which the text generator according to the embodiment is used for a service. The service recognizes speeches of a plurality of utterers, transcribes the contents of their utterances into text for the respective utterances of the utterers, and adds the names of utterers who are the sources of the respective utterances to the corresponding pieces of text.

The following describes a structure and operation of the function of the text generator according to the embodiment.

Structure

Figure 2:
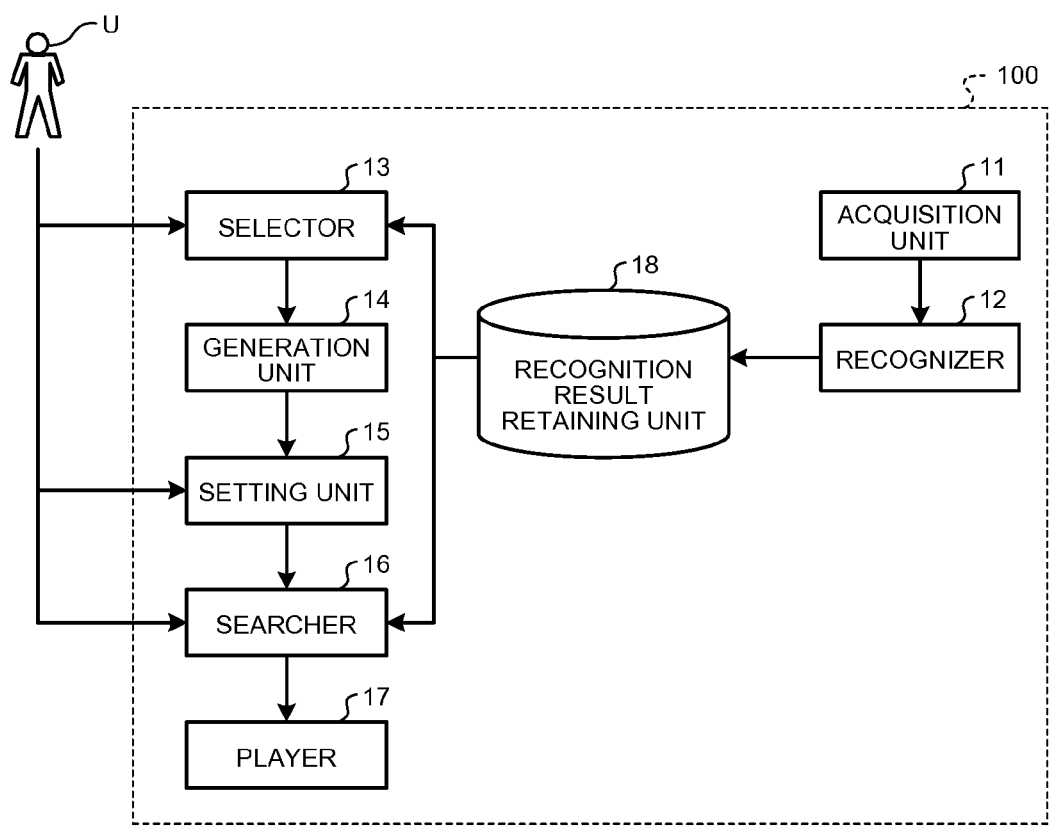
FIG. 2 is an exemplary schematic diagram illustrating a functional structure of the text generator according to the first embodiment.

FIG. 2 is a schematic diagram illustrating an example of a functional structure of the text generator according to the embodiment. As illustrated in FIG. 2, a text generator 100 according to the embodiment includes an acquisition unit 11, a recognizer 12, a selector 13, a generation unit 14, a setting unit 15, a searcher 16, a player 17, and a recognition result retaining unit 18.

The acquisition unit 11 acquires a sound by receiving sound input from a certain input unit. The recognizer 12 recognizes the sound acquired by the acquisition unit 11, calculates at least the recognized character strings in recognition units, and the confidence levels of the recognized character strings, and stores the calculation results in the recognition result retaining unit 18. The recognition unit is a morpheme, for example. The recognition result retaining unit 18 is a certain storage area in a storage device provided in the text generator 100, for example.

The selector 13 selects at least one recognized character string used for a transcribed sentence on the basis of various parameters about the work condition of the transcription work and the confidence levels of the recognized character strings stored in the recognition result retaining unit 18. Values of the various parameters about the work condition are designated by receiving the operation of an operator U through a user interface (UI), for example. The generation unit 14 generates the transcribed sentence using the recognized character strings selected by the selector 13. The setting unit 15 sets a starting position (hereinafter referred to as the "character insertion position") for character input performed by the operator U in the transcribed sentence corresponding to the recognized character string that is not selected by the selector 13. The recognized character string that is not selected is designated by receiving the operation from the operator U through the UI, for example.

The searcher 16 searches for a position of sound (hereinafter referred to as the "sound position") corresponding to an input character when the operator U starts character input at the character insertion position set by the setting unit 15. The start of the searching is instructed by receiving the operation from the operator U through the UI, for example. The player 17 plays the sound from the searched sound position.

The following describes basic processing performed by the text generator 100 according to the embodiment to generate text.

Processing

Figure 3:
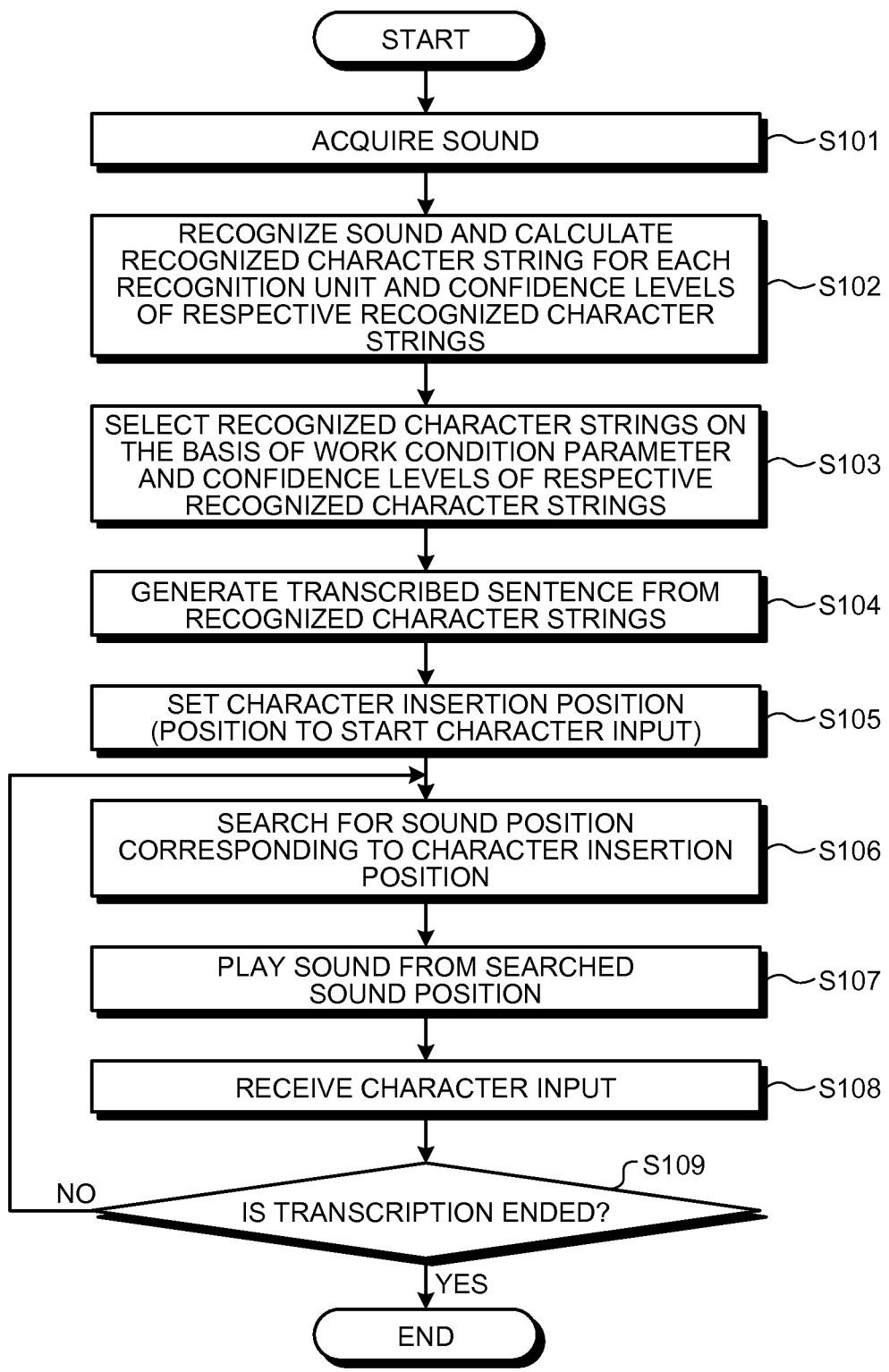
FIG. 3 is an exemplary flowchart illustrating basic processing to generate text according to the first embodiment.

FIG. 3 is a flowchart illustrating an example of the basic processing to generate text according to the embodiment. As illustrated in FIG. 3, the acquisition unit 11 acquires a sound (Step S101). The recognizer 12 recognizes the sound acquired by the acquisition unit 11 and calculates the recognized character strings in recognition units, and the confidence levels of the recognized character strings (Step S102). As a result, the recognized character strings and the confidence levels of the recognized character strings are stored in the recognition result retaining unit 18.

The selector 13 selects at least one recognized character string used for a transcribed sentence on the basis of various parameters about the work condition of the transcription work (work condition parameters) and the confidence levels of the recognized character strings stored in the recognition result retaining unit 18 (Step S103). The selector 13 selects the recognized character strings used for the transcribed sentence on the basis of either a combination of the parameter about the transcription accuracy and the confidence level of the recognized character string or a combination of the parameter about the workload needed for transcription and the confidence level of the recognized character string. The generation unit 14 generates the transcribed sentence using the recognized character strings selected by the selector 13 and the recognized character strings that are not selected by the selector 13 (Step S104).

The setting unit 15 sets the character insertion position for the operator U at the position in the transcribed sentence corresponding to the recognized character string that is not selected by the selector 13 in accordance with the setting received from the operator U (Step S105). The searcher 16 searches for the sound position corresponding to the character insertion position set by the setting unit 15 on the basis of the recognition results (Step S106).

The player 17 plays sound from the sound position searched by the searcher 16 in accordance with the designation received from the operator U (Step S107). Thereafter, the text generator 100 receives character input (addition or correction) from the operator U (Step S108).

The text generator 100 according to the embodiment ends the processing when receiving an instruction to end the transcription from the operator U (Yes at S109). In contrast, the text generator 100 repeats the processing from S106 to S108 (No at S109) until the instruction to end the transcription is performed by the operator U.

Details

The details of the functional units are described below.

Details of Respective Functional Units

Acquisition Unit 11

The acquisition unit 11 acquires sound serving as a target from which characters are transcribed.

Recognizer 12

The recognizer 12 recognizes the sound acquired by the acquisition unit 11 and obtains at least the recognized character strings in recognition units, and the confidence levels of the recognized character strings as the recognition results.

FIG. 4 is a schematic diagram illustrating an example of data of a speech recognition result D1 according to the embodiment. FIG. 4 illustrates an exemplary result obtained when the recognizer 12 recognizes an utterance of "konnichiwa, ABC kaisha no taro desu" (in English, "Hello, this is Taro from ABC Company"). The recognizer 12 obtains the speech recognition result D1 that includes recognition IDs, recognized character strings, and the confidence levels of recognized character strings, for example. The recognizer 12 stores the obtained speech recognition result D1 in the recognition result retaining unit 18.

Selector 13

The selector 13 selects at least one recognized character string used for the transcribed sentence on the basis of either a combination of the parameter about the transcription accuracy and the confidence level of the recognized character string or a combination of the parameter about the workload needed for transcription and the confidence level of the recognized character string.

The transcription accuracy and the workload needed for transcription are described below. The transcription accuracy is a value indicating a degree of coincidence between the transcribed character string and the character string when the speech is correctly transcribed into the characters (a correct answer character string). The larger the value the higher the degree of coincidence between the transcribed character string and the correct answer character string, indicating that the transcription is correct. The workload needed for transcription is the workload needed for transcribing a speech into characters and corresponds to time taken to or costs needed for the transcription work.

Figure 5:
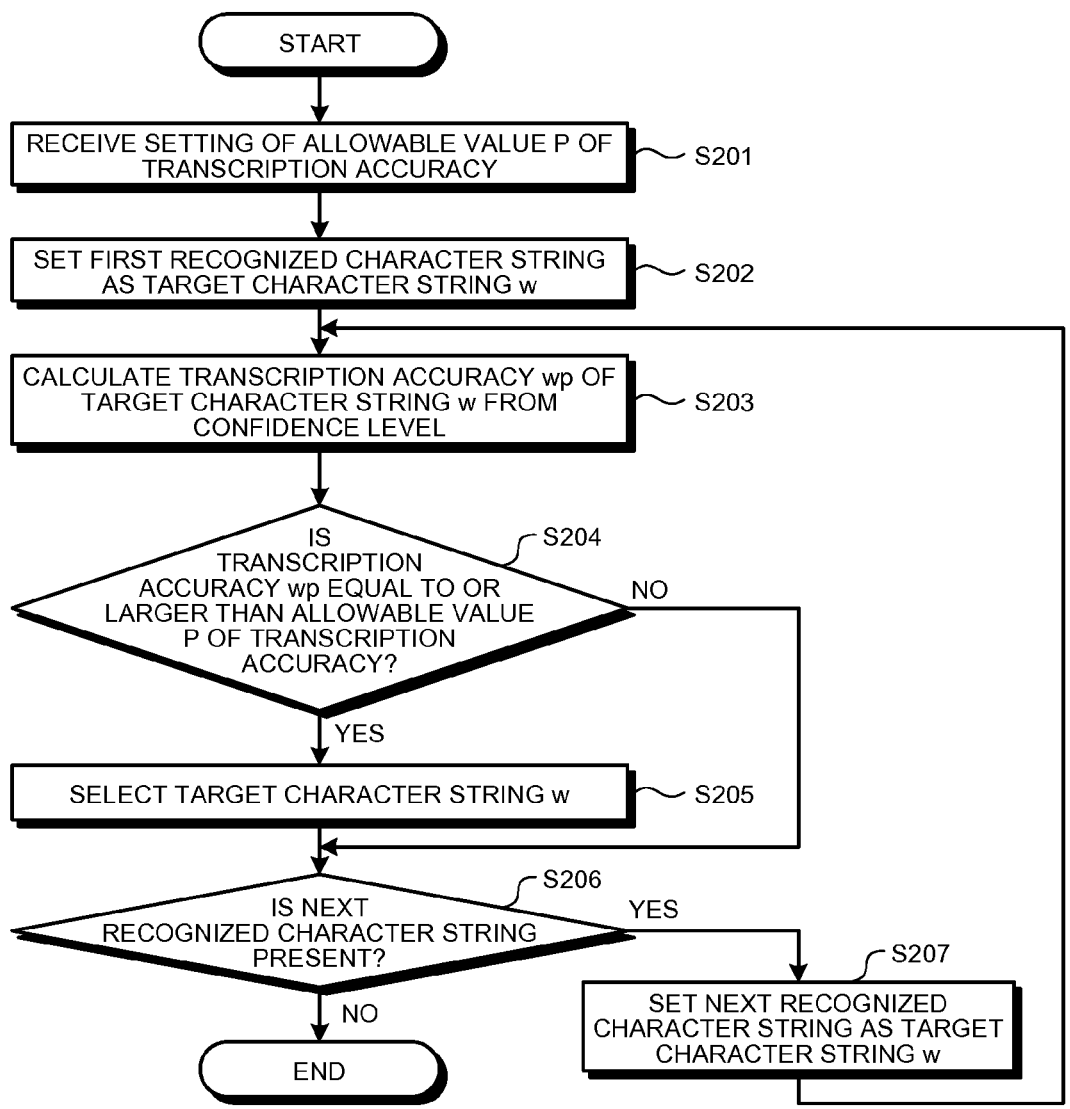
FIG. 5 is a first exemplary flowchart illustrating processing to select recognized character strings according to the first embodiment.

The following describes processing performed by the selector 13 to select the recognized character strings. FIG. 5 is a flowchart illustrating a first example of processing to select the recognized character strings according to the embodiment. FIG. 5 illustrates an example of processing when the selector 13 uses an allowable value of the transcription accuracy as the parameter about the transcription accuracy.

As illustrated in FIG. 5, the selector 13 first receives the setting of an allowable value P of the transcription accuracy from the operator U (Step S201).

Figures 6, 7:
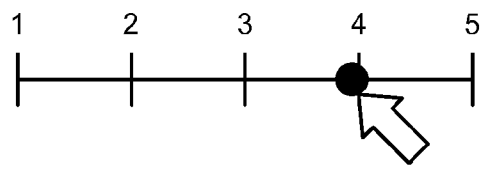
FIG. 6 is an exemplary schematic diagram illustrating a setting of an allowable value of transcription accuracy according to the first embodiment.
FIG. 7 is a first exemplary schematic diagram illustrating data of a selection result of the recognized character strings according to the first embodiment.

FIG. 6 is a schematic diagram illustrating an example of the setting of the allowable value P of the transcription accuracy according to the embodiment. As illustrated in FIG. 6, the operator U sets the allowable value P of the transcription accuracy through a slider UI (slide bar) that allows one allowable step to be designated out of N steps (N=5 in FIG. 6), for example. The selector 13 displays the UI on a screen in this way and receives the setting from the operator U.

Referring back to FIG. 5, the selector 13 then sets the first recognized character string in the recognition results obtained by the recognizer 12 (the recognition results stored in the recognition result retaining unit 18) as a target character string w (Step S202) and then calculates transcription accuracy wp of the target character string w from the confidence level of the target character string w (Step S203). The selector 13 calculates the transcription accuracy wp of the target character string w using the following expression (1) when positive integers from 1 to N are used as the respective transcription accuracies, for example.

$$wp = N \times (\text{confidence level of } w/\text{maximum of confidence level}) \quad (1)$$

The selector 13 then compares the calculated transcription accuracy wp of the target character string w with the allowable value P of the transcription accuracy and determines whether the transcription accuracy wp is equal to or larger than the allowable value P (Step S204). If it is determined that the transcription accuracy wp is equal to or larger than the allowable value P (Yes at S204), the selector 13 selects the target character string w (Step S205). If it is determined that the transcription accuracy wp is smaller than the allowable value P (No at S204), the selector 13 does not select the target character string w.

The selector 13 then determines whether the next recognized character string is present in the recognition results obtained by the recognizer 12 (Step S206). If it is determined that the next recognized character string is present (Yes at S206), the selector 13 sets the next recognized character string as the target character string w (Step S207) and then repeats the processing from S203 to S206. If it is determined that no next recognized character string is present (No at S206), the selector 13 ends the processing.

FIG. 7 is a schematic diagram illustrating a first example of data of a recognized character string selection result D2 according to the embodiment. FIG. 7 illustrates a selection result in which the recognized character strings are selected on the basis of the transcription accuracies wp calculated by expression (1) where N=5, the allowable value P=4, and the maximum of the confidence level=100. The selector 13 obtains the recognized character string selection result D2 that includes the recognition IDs, the recognized character strings, the confidence levels of the recognized character strings, the transcription accuracies wp, and the selection results, for example. The selector 13 may select the recognized character strings on the basis of the workload needed for transcription (e.g., a "work time" and a "work cost").

Figure 8:
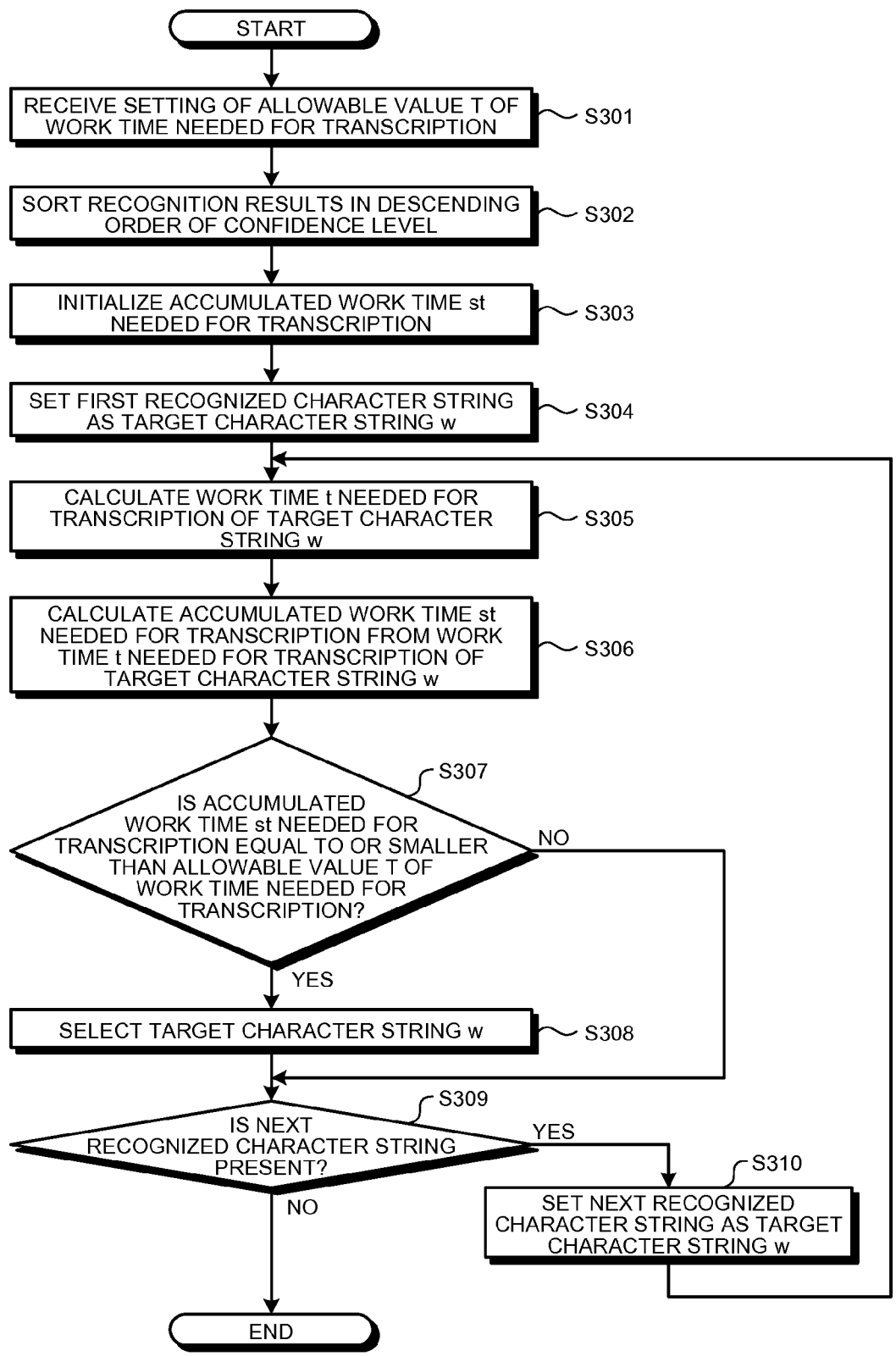
FIG. 8 is a second exemplary flowchart illustrating the processing to select the recognized character strings according to the first embodiment.

FIG. 8 is a flowchart illustrating a second example of processing to select the recognized character strings according to the embodiment. FIG. 8 illustrates the exemplary processing when the selector 13 uses an allowable value of the work time needed for transcription as the parameter about the workload needed for transcription.

As illustrated in FIG. 8, the selector 13 first receives the setting of an allowable value T of the work time needed for transcription from the operator U (Step S301).

Figures 9, 10:
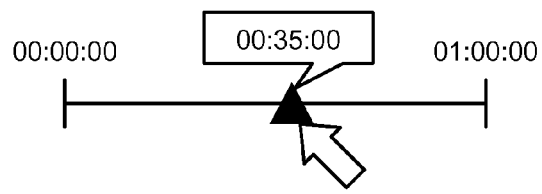
FIG. 9 is an exemplary schematic diagram illustrating a setting of an allowable value of transcription work time according to the first embodiment.
FIG. 10 is a second exemplary schematic diagram illustrating the data of the selection result of the recognized character strings according to the first embodiment.

FIG. 9 is a schematic diagram illustrating an example of the setting of the allowable value T of the work time needed for transcription according to the embodiment. As illustrated in FIG. 9, the operator U sets the allowable value T of the work time needed for transcription through a slider UI (slide bar) that enables a time from 00:00:00 to HH:MM:SS to be designated, for example. The selector 13 displays the UI on the screen in this way and receives the setting from the operator U. As for the maximum time that can be designated, a predetermined value is used, for example. A value calculated in the following manner may be used as the maximum time that can be designated. For example, a work time per character is preliminarily determined; the work time per character is multiplied by the number of all characters in the recognized character strings obtained by the recognizer 12 to calculate a product; and the calculated value may be used. When the recognizer 12 outputs start times and end times of the respective recognized character strings as the recognition results, the output start time is subtracted from the output end time of each recognized character string to calculate a time (utterance time). The sum of the respective utterance times of all of the recognized character strings may be used.

Referring back to FIG. 8, the selector 13 then sorts the recognition results obtained by the recognizer 12 in descending order of the confidence level of the recognized character string (Step S302). The selector 13 then initializes an accumulated work time st that indicates the accumulation of the work time needed for transcription (Step S303).

The selector 13 then sets the first recognized character string in the recognition results sorted in descending order as the target character string w (Step S304) and then calculates a work time t needed for transcription of the target character string w (Step S305). The selector 13 calculates the work time t needed for transcription of the target character string w by the following expression (2) using the number of characters of the target character string w, for example.

$$t = \alpha \times (\text{the number of characters of the target character string } w) \quad (2)$$

An average time needed for transcription per character is used as $\alpha$, for example.

When the recognizer 12 outputs the start times and end times of the respective recognized character strings as the recognition results, the selector 13 may calculate the work time t needed for transcription of the target character string w by the following expression (3), for example.

$$t = \beta \times (\text{the end time of target character string } w - \text{the start time of target character string } w) \quad (3)$$

An average time needed for transcription per morpheme (in recognition units) is used as $\beta$, for example.

The selector 13 then calculates the accumulated work time st needed for transcription from the work time t needed for transcription of the target character string w (Step S306).

The selector 13 cumulatively adds the work time t needed for transcription of the target character string w calculated by using expression (2) or (3) to the accumulated work time st needed for transcription, for example.

The selector 13 then compares the calculated accumulated work time st needed for transcription with the allowable value T of the work time needed for transcription and determines whether the accumulated work time st is equal to or smaller than the allowable value T (Step S307). If it is determined that the accumulated work time st is equal to or smaller than the allowable value T (Yes at S307), the selector 13 selects the target character string w (Step S308). If it is determined that the accumulated work time st is larger than the allowable value T (No at S307), the selector 13 does not select the target character string w.

The selector 13 then determines whether the next recognized character string is present in the recognition results obtained by the recognizer 12 (Step S309). If it is determined that the next recognized character string is present (Yes at S309), the selector 13 sets the next recognized character string as the target character string w (Step S310) and repeats the processing from S305 to S309. If it is determined that no next recognized character string is present (No at S309), the selector 13 ends the processing.

FIG. 10 is a schematic diagram illustrating a second example of the data of the recognized character string selection result D2 according to the embodiment. FIG. 10 illustrates a selection result in which the recognized character strings are selected on the basis of the work times t needed for transcription calculated by using expression (3). The selector 13 obtains the recognized character string selection result D2 that includes the recognition IDs, the recognized character strings, the confidence levels of the recognized character strings, the work times t needed for transcription, the accumulated work times st, and the selection results, for example.

Figure 11:
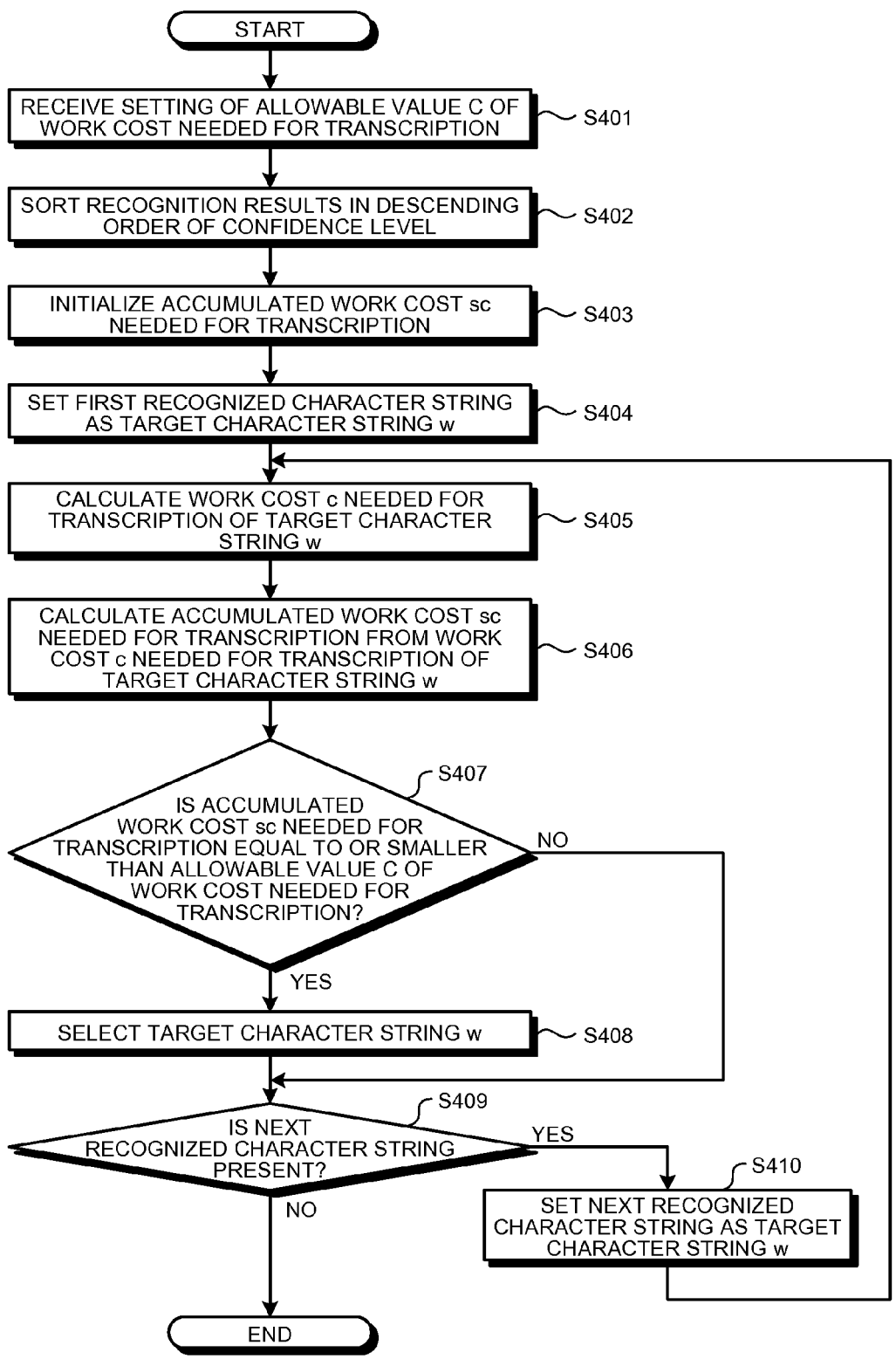
FIG. 11 is a third exemplary flowchart illustrating the processing to select the recognized character strings according to the first embodiment.

FIG. 11 is a flowchart illustrating a third example of the processing to select the recognized character strings according to the embodiment. FIG. 11 illustrates the exemplary processing when the selector 13 uses an allowable value of the work cost needed for transcription as the parameter about the workload needed for transcription.

As illustrated in FIG. 11, the selector 13 first receives the setting of an allowable value C of the work cost needed for transcription from the operator U (Step S401).

Figures 12, 13:
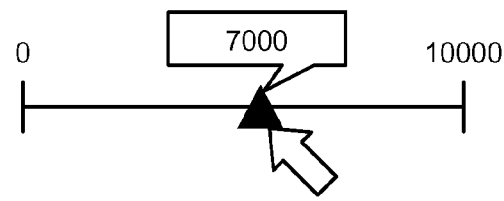
FIG. 12 is an exemplary schematic diagram illustrating a setting of an allowable value of a transcription work cost according to the first embodiment.
FIG. 13 is a third exemplary schematic diagram illustrating the data of the selection result of the recognized character strings according to the first embodiment.

FIG. 12 is a schematic diagram illustrating an example of the setting of the allowable value C of the work cost needed for transcription in the embodiment. As illustrated in FIG. 12, the operator U sets the allowable value C of the work cost needed for transcription through a slider UI (slide bar) that enables a value from zero to a maximum to be designated, for example. The selector 13 displays the UI on the screen in this way and receives the setting from the operator U. As for the maximum value that can be designated, a predetermined value is used, for example. A value calculated in the following manner may be used as the maximum value that can be designated. For example, a work time per character is preliminarily determined; the work time per character is multiplied by the number of all characters in the recognized character strings obtained by the recognizer 12 to calculate a product; and the calculated value may be used. When the recognizer 12 outputs the utterance times (times subtracting the end times from the start times) of the respective recognized character strings as the recognition results, the sum of the output utterance times of the respective recognized character strings is multiplied by the work cost per unit time to calculate a product, and the calculated value may be used.

Referring back to FIG. 11, the selector 13 then sorts the recognition results obtained by the recognizer 12 in descending order of the confidence level of the recognized character string (Step S402). The selector 13 then initializes an accumulated work cost sc that indicates the accumulation of the work cost needed for transcription (Step S403).

The selector 13 then sets the first recognized character string in the recognition results sorted in descending order as the target character string w (Step S404) and then calculates a work cost c needed for transcription of the target character string w (Step S405). The selector 13 calculates the work cost c needed for transcription of the target character string w by the following expression (4) using the number of characters of the target character string w, for example.

$$c = \gamma \times (\text{the number of characters of the target character string } w) \quad (4)$$

An average cost needed for transcription per character is used as $\gamma$, for example.

When the recognizer 12 outputs the start times and end times of the respective recognized character strings as the recognition results, the selector 13 may calculate the work cost c needed for transcription of the target character string w by the following expression (5), for example.

$$c = \zeta \times (\text{the end time of target character string } w - \text{the start time of target character string } w) \quad (5)$$

An average cost needed for transcription per morpheme (in recognition units) is used as $\zeta$, for example.

The selector 13 then calculates the accumulated work cost sc needed for transcription from the work cost c needed for transcription of the target character string w (Step S406). The selector 13 cumulatively adds the work cost c needed for transcription of the target character string w calculated by using expression (4) or (5) to the accumulated work cost sc needed for transcription.

The selector 13 then compares the calculated accumulated work cost sc needed for transcription with the allowable value C of the work cost needed for transcription and determines whether the accumulated work cost sc is equal to or smaller than the allowable value C (Step S407). If it is determined that the accumulated work cost sc is equal to or smaller than the allowable value C (Yes at S407), the selector 13 selects the target character string w (Step S408). If it is determined that the accumulated work cost sc is larger than the allowable value C (No at S407), the selector 13 does not select the target character string w.

The selector 13 then determines whether the next recognized character string is present in the recognition results obtained by the recognizer 12 (Step S409). If it is determined that the next recognized character string is present (Yes at S409), the selector 13 sets the next recognized character string as the target character string w (Step S410) and repeats the processing from S405 to S409. If it is determined that no next recognized character string is present (No at S409), the selector 13 ends the processing.

FIG. 13 is a schematic diagram illustrating a third example of the data of the recognized character string selection result D2 according to the embodiment. FIG. 13 illustrates a selection result in which the recognized character strings are selected on the basis of the work costs c needed for transcription calculated by using expression (5). The selector 13 obtains the recognized character string selection result D2 that includes the recognition IDs, the recognized character strings, the confidence levels of the recognized character strings, the work costs c needed for transcription, the accumulated work costs sc, and the selection results, for example.

Generation Unit 14

The generation unit 14 generates the transcribed sentence using the recognized character strings selected and the recognized character strings not selected by the selector 13.

Figure 14:
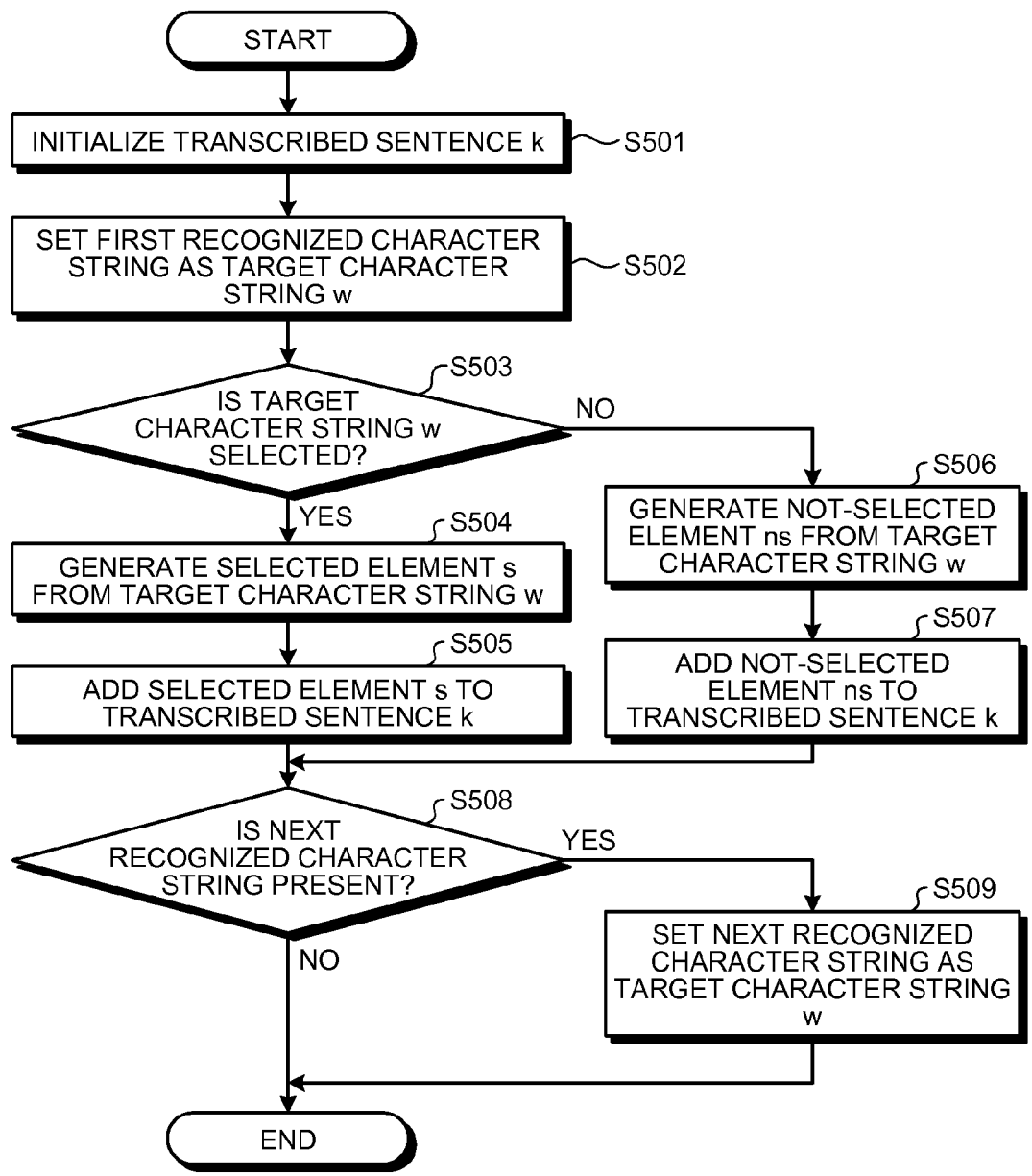
FIG. 14 is an exemplary flowchart illustrating processing to generate a transcribed sentence according to the first embodiment.

The following describes processing performed by the generation unit 14 to generate a transcribed sentence. FIG. 14 is a flowchart illustrating an example of processing to generate a transcribed sentence according to the embodiment. FIG. 15 is a schematic diagram illustrating an example of a data format of the transcribed sentence according to the embodiment.

As illustrated in FIG. 14, the generation unit 14 first initializes a transcribed sentence k (Step S501). As illustrated in FIG. 15, the transcribed sentence k is produced generated as a division (DIV) element when the data format is a hyper text markup language (HTML), for example.

The generation unit 14 then sets the first recognized character string in the recognition results obtained by the recognizer 12 as the target character string w (Step S502) and then determines whether the target character string w is selected by the selector 13 (Step S503). If it is determined that the target character string w is selected (Yes at S503), the generation unit 14 generates a selected element s from the target character string w (Step S504) and then adds the generated selected element s to the transcribed sentence k (Step S505). As illustrated in FIG. 15, the selected element is generated as a span element having an ID attribute of the recognition ID of the target character string w and a class attribute of the character string representing the selected element s (e.g., "selected"), for example. If it is determined that the target character string w is not selected (No at S503), the generation unit 14 generates a not-selected element ns from the target character string w (Step S506) and then adds the generated not-selected element ns to the transcribed sentence k (Step S507). As illustrated in FIG. 15, the not-selected element ns is generated as a span element having an ID attribute of the recognition ID of the target character string w and a class attribute of the character string representing the not-selected element ns (e.g., "not_selected"), for example.

The generation unit 14 then determines whether the next recognized character string is present in the recognition results obtained by the recognizer 12 (Step S508). If it is determined that the next recognized character string is present (Yes at S508), the generation unit 14 sets the next recognized character string as the target character string w (Step S509) and repeats the processing from S503 to S508. If it is determined that no next recognized character string is present (No at S508), the generation unit 14 ends the processing.

FIG. 16 is a schematic diagram illustrating examples of a display of the transcribed sentence k according to the embodiment. As illustrated in FIG. 16, the generation unit 14 may generate the transcribed sentence k that can be displayed in different forms that unambiguously differentiate the character strings of the selected elements s from the character strings of the not-selected elements ns. Section (A) of FIG. 16 illustrates a display example in which the character strings of the not-selected elements ns are underlined. Section (B) of FIG. 16 illustrates another display example in which the sizes of the characters in the character strings of the not-selected elements ns are smaller than those of the characters in the character strings of the selected elements s. Section (C) of FIG. 16 illustrates still another display example in which the character strings of the not-selected elements ns are shaded. Section (D) of FIG. 16 is still another display example in which the characters in the character strings of the not-selected elements ns are replaced with certain characters (filled circles in section (D) of FIG. 16). Other display examples are available by changing the density, color, or font of the character or a background color, in addition to these display examples. When the recognizer 12 outputs the recognized character strings up to the N-th candidate in descending order of confidence level (N is an integer equal to or larger than one) in recognition units, the transcribed sentence k may be generated in which the recognized character strings up to the N-th candidate are displayed for the not-selected character string such that they are selectable by the operator U.

Setting Unit 15

The setting unit 15 sets the character insertion position (position to start character input) on the basis of the not-selected element ns of the transcribed sentence k generated by the generation unit 14. The setting unit 15 sets the character insertion position on the basis of a detected current character insertion position and a positional relation between the selected element corresponding to the recognized character string selected by the selector 13 and the not-selected element corresponding to the recognized character string that is not selected by the selector 13 in the transcribed sentence.

Figure 17:
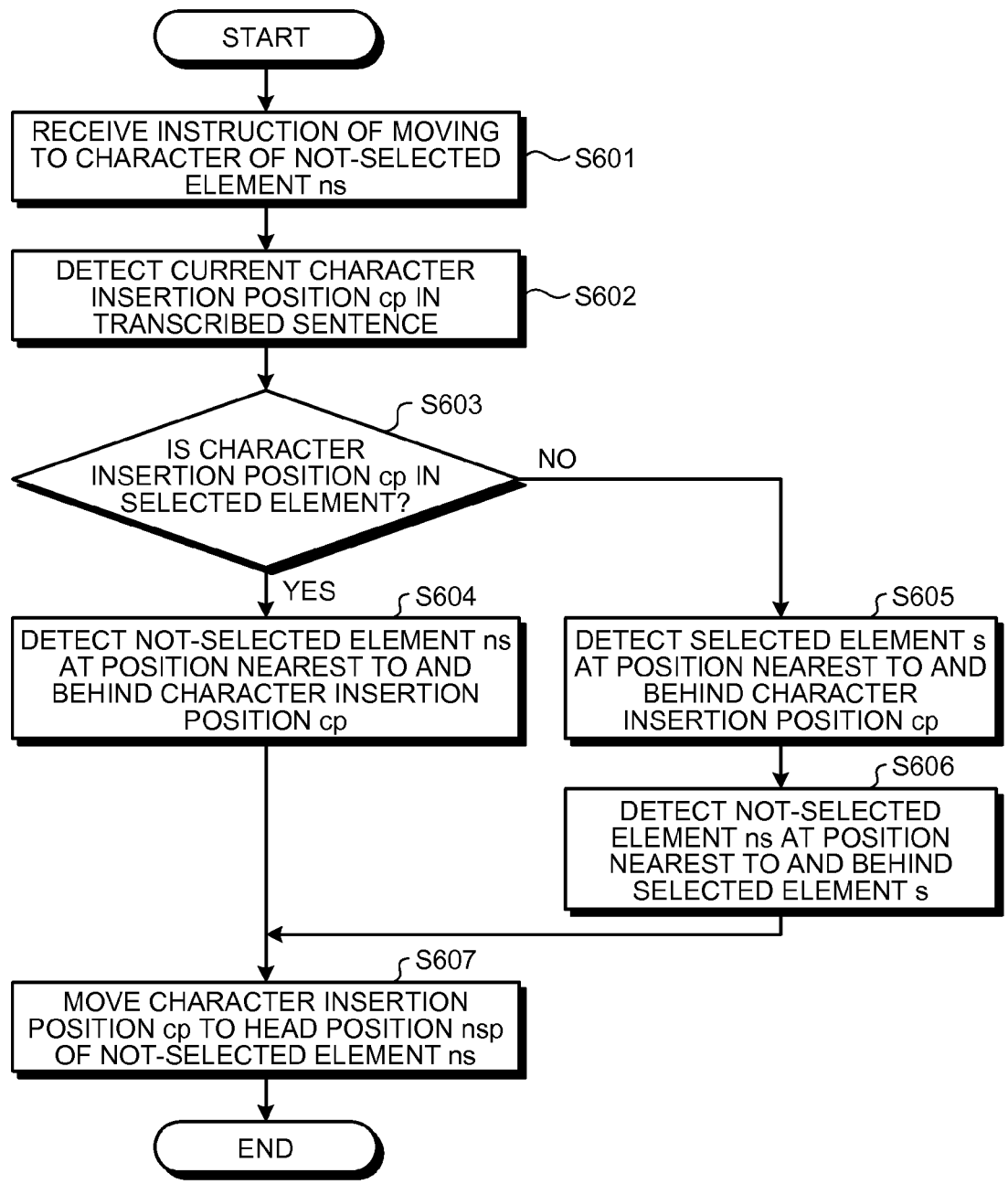
FIG. 17 is an exemplary flowchart illustrating processing to set a character insertion position according to the first embodiment.

The following describes processing performed by the setting unit 15 to set the character insertion position. FIG. 17 is a flowchart illustrating an example of processing to set the character insertion position according to the embodiment.

As illustrated in FIG. 17, the setting unit 15 first receives an instruction of movement to the character of the not-selected element ns (Step S601) from the operator U. The setting unit 15 determines that the movement is instructed when pressing down of a certain key (e.g., "tab key") in the displayed transcribed sentence is detected, for example, and receives the instruction. The setting unit 15 then detects a current character insertion position cp in the transcribed sentence (Step S602). The current character insertion position cp is the character insertion position cp in the character string in the transcribed sentence at the moment. The current character insertion position cp corresponds to a cursor position (e.g., the "position where the vertical bar flashes") on the screen on which the transcribed sentence is displayed, for example.

The setting unit 15 then determines whether the detected current character insertion position cp is in the selected element (Step S603). If it is determined that the current character insertion position cp is in the selected element (Yes at S603), the setting unit 15 detects the not-selected element ns at the position nearest to and behind the current character insertion position cp (Step S604). If it is determined that the current character insertion position cp is not in the selected element (No at S603), the setting unit 15 detects the selected element s at the position nearest to and behind the current character insertion position cp (Step S605). The setting unit 15 then detects the not-selected element ns at the position nearest to and behind the detected selected element s (Step S606). The setting unit 15 then moves the character insertion position cp to a head position nsp of the detected not-selected element ns (Step S607).

When other continuous not-selected elements are present behind the not-selected element ns, to the head position nsp of which the current character insertion position cp is moved, the setting unit 15 may display the character string of the not-selected element ns and the character strings of the other not-selected elements in different forms from each other. The setting unit 15 may highlight the character string of the not-selected element ns and the character strings of the other not-selected elements using different background colors from each other.

Searcher 16

When the operator U starts character input at the character insertion position cp, the searcher 16 searches for the sound position corresponding to the input character.

Figure 18:
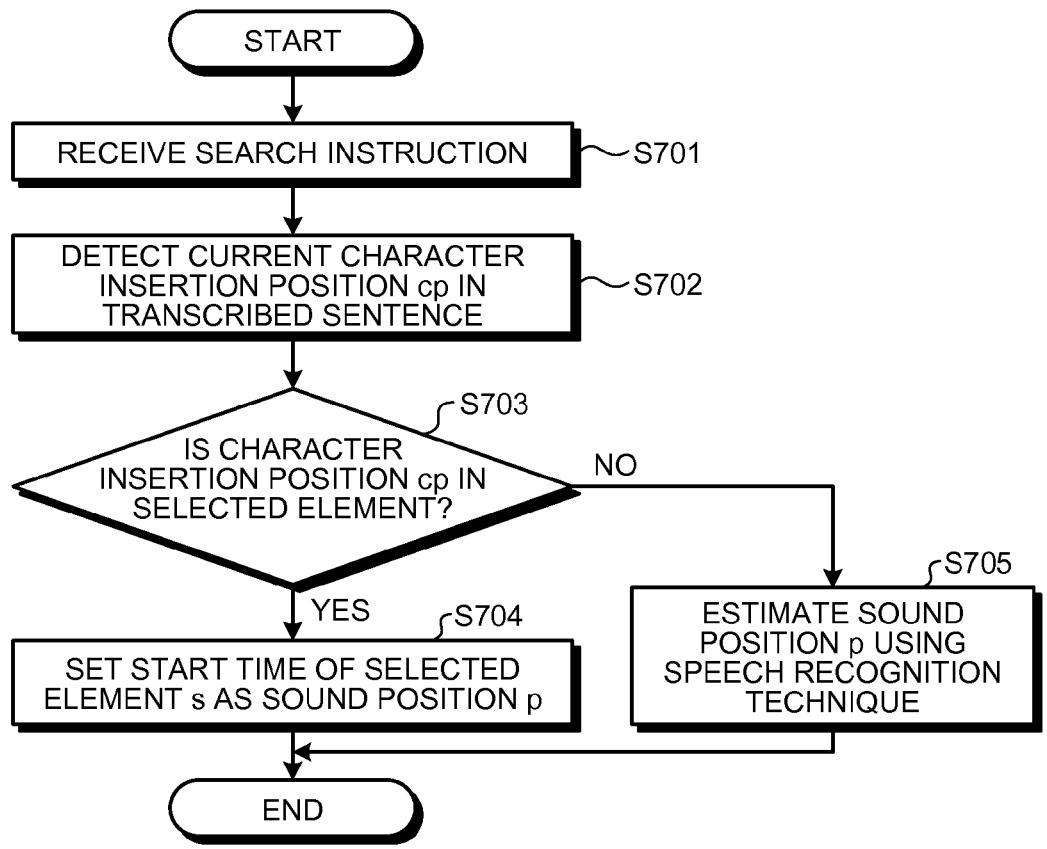
FIG. 18 is an exemplary flowchart illustrating processing to search for a sound position according to the first embodiment.

The following describes processing performed by the searcher 16 to search for the sound position. FIG. 18 is a flowchart illustrating an example of the processing to search for sound position according to the embodiment.

As illustrated in FIG. 18, the setting unit 15 first receives the instruction to search for the sound position corresponding to the current character insertion position cp from the operator U (Step S701). The searcher 16 determines that the search is instructed when pressing down of an enter key in the displayed transcribed sentence is detected, for example, and receives the instruction.

The searcher 16 then detects the current character insertion position cp in the transcribed sentence (Step S702). The searcher 16 then determines whether the detected current character insertion position cp is in the selected element (Step S703).

If it is determined that the current character insertion position cp is in the selected element (Yes at S703), the searcher 16 sets the start time of the selected element s as a sound position p (Step S704). If it is determined that the current character insertion position cp is not in the selected element (No at S703), the searcher 16 estimates the sound position p using a certain speech recognition technique (e.g., a "forced alignment method") (Step S705). The searcher 16 estimates the sound position p using the speech recognition technique on the basis of the transcribed sentence k, the start time of the recognized character string corresponding to the not-selected element ns in which the character insertion position cp is present, and the current sound playing position, for example.

Player 17

The player 17 plays the sound from the sound position p searched by the searcher 16.

As described above, the text generator 100 according to the embodiment selects the recognized character strings recognized from sound on the basis of the confidence levels of the recognized character strings calculated in accordance with the speech recognition result and the various parameters about the work condition of the transcription work (at least one of the parameters about the transcription accuracy and the workload needed for transcription) designated by the operator U, and generates the transcribed sentence.

The text generator 100 thus structured in the embodiment adjusts the output of the speech recognition result in accordance with the work condition designated by the operator U. When the operator U performs addition or correction on the adjusted output, the text generator 100 in the embodiment provides an environment allowing the operator U to perform the transcription work by synchronizing the input character with the sound using the speech recognition result.

As a result, the text generator 100 in the embodiment enables an appropriate speech recognition result according to the work condition of transcription to be used in the transcription work, thereby making it possible to readily add characters to or correct characters of the speech recognition result. Consequently, the text generator 100 in the embodiment can reduce the burden placed on the operator U in the transcription work.

Second Embodiment

Overview

The following describes the function (text generating function) of the text generator according to a second embodiment. The text generator according to the second embodiment differs from the first embodiment according to that the recognition results obtained by the recognizer are connected on a sentence basis or on a time basis and the result of the connection is used for a transcribed sentence. More specifically, the text generator according to the second embodiment uses, for a transcribed sentence, the result of the connection in which the recognition results are connected on a sentence basis in accordance with the expressions of sentence ends of the respective recognized character strings. Alternatively, the text generator according to the second embodiment uses, for a transcribed sentence, the result of the connection in which the recognition results are connected on a certain time basis in accordance with the start times and the end times of the respective recognized character strings.

The following describes a structure and operation of the function of the text generator according to the embodiment. In the following description, items different from those of the first embodiment are described, and the same items are labeled with the same reference numerals and the duplicated descriptions thereof are omitted.

Structure

Figure 19:
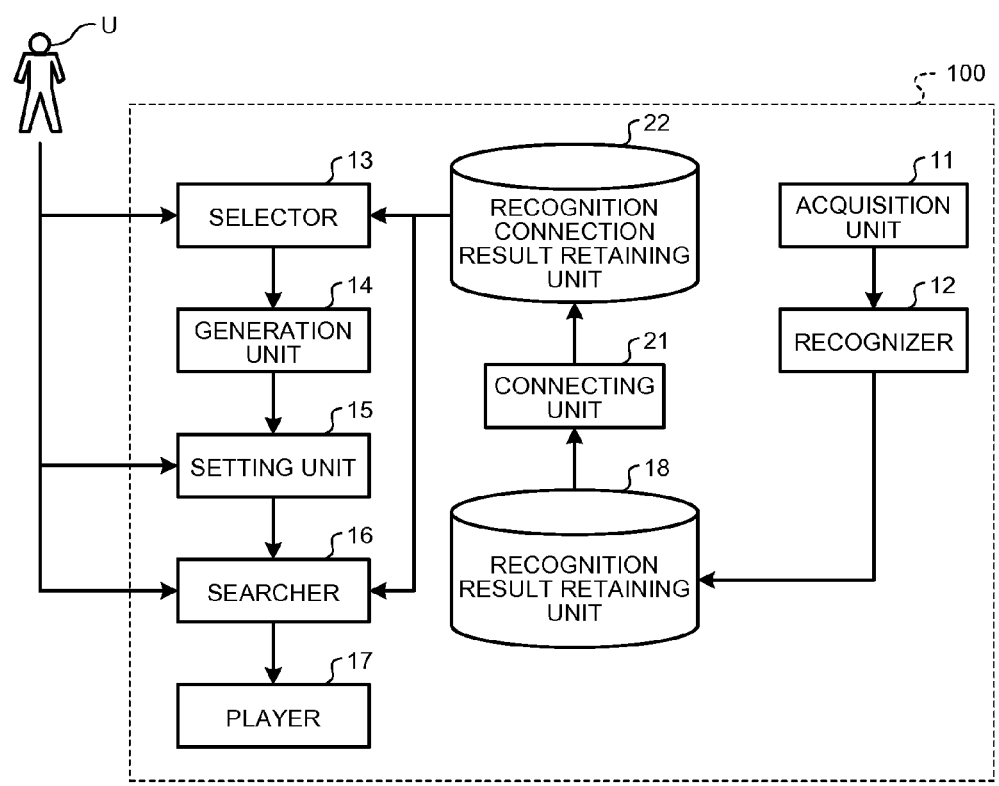
FIG. 19 is an exemplary schematic diagram illustrating a functional structure of the text generator according to a second embodiment.

FIG. 19 is a schematic diagram illustrating a functional structure of the text generator 100 according to the embodiment. As illustrated in FIG. 19, the text generator 100 according to the embodiment further includes a connecting unit 21 and a recognition connection result retaining unit 22 in addition to the structure of the first embodiment.

The connecting unit 21 connects the recognition results (the recognition results stored in the recognition result retaining unit 18) obtained by the recognizer 12 on a sentence basis or on a time basis and stores the result of the connection in the recognition connection result retaining unit 22. The recognition connection result retaining unit 22 is a certain storage area in the storage device provided in the text generator 100, for example. The selector 13 and the searcher 16 use the recognition connection results stored in the recognition connection result retaining unit 22.

The following describes basic processing performed by the text generator 100 according to the embodiment to generate text.

Processing

Figure 20:
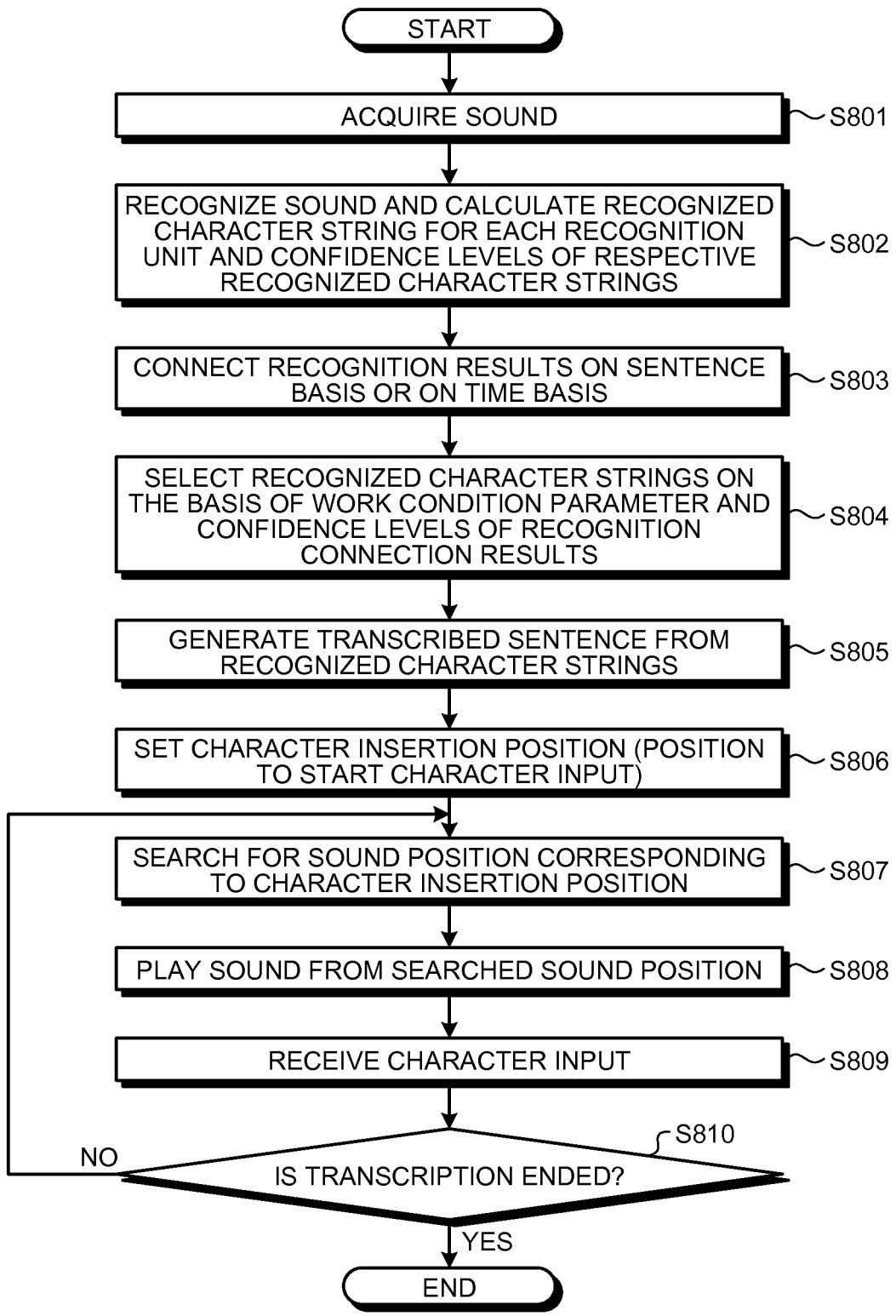
FIG. 20 is an exemplary flowchart illustrating basic processing to generate text according to the second embodiment.

FIG. 20 is a flowchart illustrating an example of basic processing to generate text according to the embodiment. As illustrated in FIG. 20, the acquisition unit 11 acquires a sound (Step S801). The recognizer 12 recognizes the sound acquired by the acquisition unit 11 and calculates the recognized character strings in recognition units, and the confidence levels of the recognized character strings (Step S802). As a result, the recognized character strings and the confidence levels of the recognized character strings are stored in the recognition result retaining unit 18.

The connecting unit 21 connects the recognition results of the recognizer 12 on a certain sentence basis or on a certain time basis (Step S803). The connected recognized character strings and the confidence levels of the connected recognized character strings are stored in the recognition connection result retaining unit 22 as the recognition connection results. The selector 13 selects at least one recognized character string used for a transcribed sentence on the basis of various parameters about the work condition of the transcription work (work condition parameters) and the confidence levels (confidence levels of the recognized character strings after the connection) of the recognition connection results stored in the recognition connection result retaining unit 22 (Step S804). The selector 13 selects the recognized character strings used for the transcribed sentence on the basis of either a combination of the parameter about the transcription accuracy and the confidence level of the recognized character string or a combination of the parameter about the workload needed for transcription and the confidence level of the recognized character string.

The generation unit 14 generates the transcribed sentence using the recognized character strings selected by the selector 13 and the recognized character strings that are not selected by the selector 13 (Step S805). The setting unit 15 sets the character insertion position for the operator U in the transcribed sentence corresponding to the recognized character string that is not selected by the selector 13 in accordance with the setting received from the operator U (Step S806). The searcher 16 searches for the sound position corresponding to the character insertion position set by the setting unit 15 on the basis of the recognition results (Step S807).

The player 17 plays a sound from the sound position searched for by the searcher 16 in accordance with the designation received from the operator U (Step S808). Thereafter, the text generator 100 receives character input (addition or correction) from the operator U (Step S809).

The text generator 100 according to the embodiment ends the processing when receiving an instruction to end the transcription from the operator U (Yes at S810). In contrast, the text generator 100 repeats the processing from S807 to S809 (No at S810) until the instruction to end the transcription is performed by the operator U.

Details

The following mainly describes the details of the connecting unit 21 and the selector 13.

Details of Respective Functional Units

Connecting Unit 21

The connecting unit 21 connects the recognition results on a sentence basis in accordance with sentence end expressions of the respective recognized character strings and obtains the recognition connection results. Alternatively, the connecting unit 21 connects the recognition results on a certain time basis in accordance with the start times and the end times of the respective recognized character strings and obtains the recognition connection results including the connected character strings (recognized character strings after the connection) and the confidence levels of the connection results.

Figure 21:
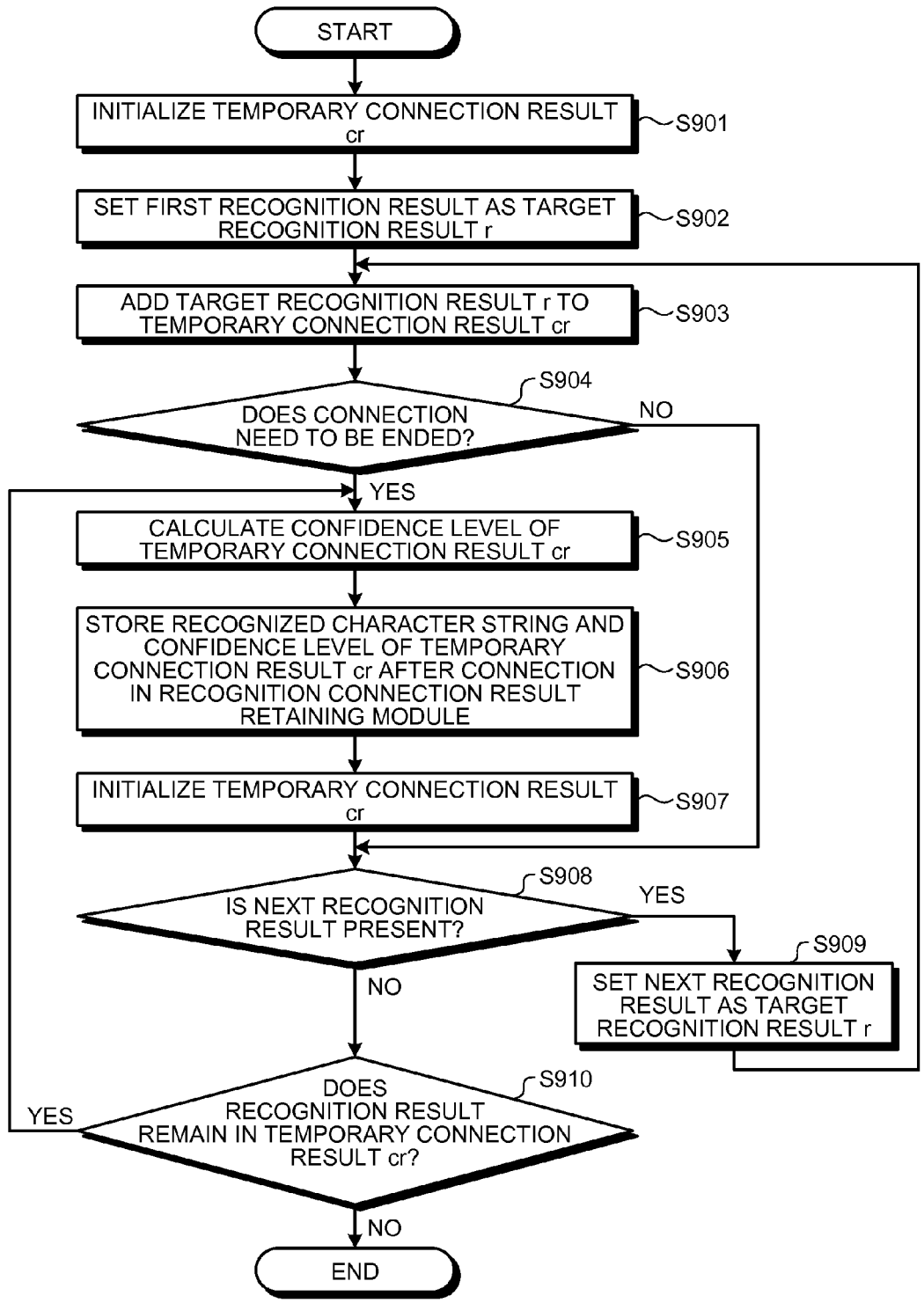
FIG. 21 is an exemplary flowchart illustrating processing to connect the recognition results according to the second embodiment.

The following describes processing performed by the connecting unit 21 to connect the recognition results. FIG. 21 is a flowchart illustrating an example of processing to connect the recognition connection results according to the embodiment.

As illustrated in FIG. 21, the connecting unit 21 first initializes a temporary connection result cr of the recognition results (the recognition results stored in the recognition result retaining unit 18) obtained by the recognizer 12 (Step S901). The connecting unit 21 sets the first recognition result of the recognition results obtained by the recognizer 12 as a target recognition result r (Step S902). The connecting unit 21 then adds the target recognition result r to the temporary connection result cr (Step S903).

The connecting unit 21 then determines whether the connection needs to be ended (Step S904). The connecting unit 21 performs determination processing differently when the connection is done on a sentence basis and when the connection is done on a time basis.

A. Determination Processing when the Connection is Done on a Sentence Basis

The connecting unit 21 determines whether the connection needs to be ended on the basis of the determination result of whether the recognized character string of the target recognition result r is the end of the sentence. If the recognized character string of the target recognition result r is the end of the sentence (Yes at S904), the connecting unit 21 determines that the connection is ended. If the recognized character string of the target recognition result r is not the end of the sentence (No at S904), the connecting unit 21 determines that the connection is not ended. The determination of the end of the sentence is made on the basis whether a character or a symbol representing the end of the sentence, such as a punctuation mark in Japanese, "○", period, ".", or "question mark", ?, is included in the recognized character string, for example. When such a character or a symbol is not included, the determination may be made on the basis whether a certain expression of sentence end, such as "desu" or "masu" in Japanese, is included in the recognized character string.

B. Determination Processing when the Connection is Done on a Time Basis

The connecting unit 21 determines whether the connection needs to be ended on the basis of the start times and the end times of the recognized character strings obtained as the recognition results. The connecting unit 21 determines that the connection is ended if a time elapsing from the start time of the recognized character string corresponding to the target recognition result r to the end time of the recognized character string corresponding to the recognition result added to the temporary connection result cr just before the target recognition result r is added is equal to or larger than a certain time (Yes at S904). If the elapsed time is smaller than the certain time, the connecting unit 21 determines that the connection is not ended (No at S904). The connecting unit 21 may determine that the connection is ended when a time elapsing from the start time of the target recognition result r to the start time of the recognized character string corresponding to the first recognition result added to the temporary connection result cr is equal to or larger than a certain time.

If it is determined that the connection is ended (Yes at S904), the connecting unit 21 calculates the confidence level of the temporary connection result cr (Step S905). The confidence level of the temporary connection result cr is calculated on the basis of the confidence levels of the recognized character strings corresponding to the recognition results added to the temporary connection result cr. For example, the average is calculated of the confidence levels of the recognized character strings corresponding to the recognition results added to the temporary connection result cr and the calculated value is set as the confidence level of the temporary connection result cr. If it is determined that the connection is not ended (No at S904), the connecting unit 21 proceeds to the processing at S908, which is described later, while skipping the processing from S905 to S907.

The connecting unit 21 then stores the character string that connects the recognized character strings and corresponds to the temporary connection result cr (the recognized character string after the connection) and the calculated confidence level of the temporary connection result cr in the recognition connection result retaining unit 22 (Step S906) and then initializes the temporary connection result cr (Step S907).

The connecting unit 21 then determines whether the next recognized result is present in the recognition results obtained by the recognizer 12 (Step S908). If it is determined that the next recognition result is present (Yes at S908), the connecting unit 21 sets the next recognition result as the target recognition result r (Step S909) and then repeats the processing from S903 to S908. If it is determined that no recognition result is present (No at S908), the connecting unit 21 determines whether the recognition result remains in the temporary connection result cr (Step S910). If it is determined that the recognition result remains in the temporary connection result cr (Yes at S910), the connecting unit 21 proceeds to the processing at S905. If it is determined that no recognition result remains in the temporary connection result cr (No at S910), the connecting unit 21 ends the processing.

Selector 13

The selector 13 selects at least one recognized character string used for the transcribed sentence on the basis of either a combination of the parameter about the transcription accuracy and the confidence level of the recognition connection result (confidence level of the recognized character string after the connection) or a combination of the parameter about the workload needed for transcription and the confidence level of the recognition connection result.

As described above, the text generator 100 according to the second embodiment selects the recognized character strings recognized from a sound on the basis of the confidence levels of the recognized character strings connected on a sentence basis or on a certain time basis and the various parameters about the work condition of the transcription work (at least one parameter of the transcription accuracy and the workload needed for transcription) designated by the operator U, and generates the transcribed sentence.

As a result, the text generator 100 in the embodiment enables the addition or correction of characters to be readily made and the burden placed on the operator U in the transcription work to be reduced in the same manner as the first embodiment.

Third Embodiment

The following describes the function (text generating function) of the text generator according to a third embodiment. The text generator according to the third embodiment differs from the first and the second embodiments in that the text generator selects, for each utterer or each utterance period, the recognized character strings recognized from sounds on the basis of the confidence levels of the recognized character strings and the various parameters about the work condition of the transcription work (the transcription accuracy or the workload needed for transcription), and generates a transcribed sentence.

The following describes a structure and operation of the function of the text generator according to the embodiment. In the following description, items different from those of the first and the second embodiments are described, and the same items are labeled with the same reference numerals and the duplicated descriptions thereof are omitted.

Structure

Figure 22:
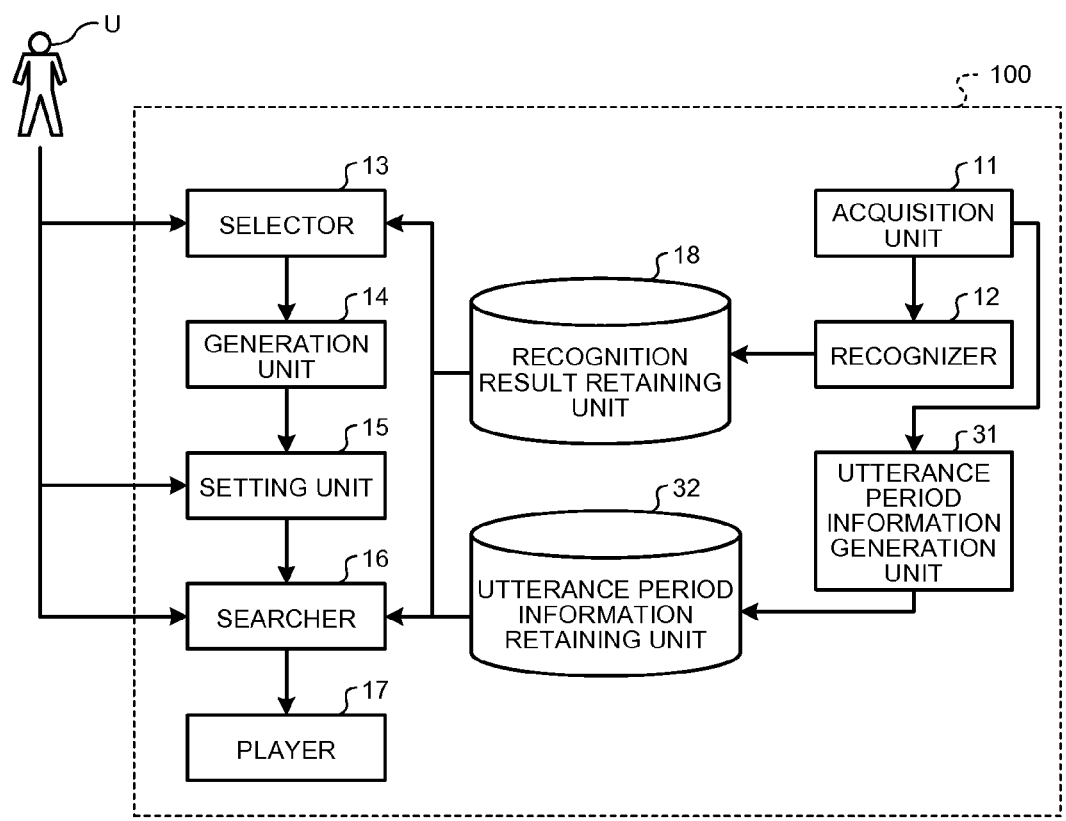
FIG. 22 is an exemplary schematic diagram illustrating a functional structure of the text generator according to a third embodiment.

FIG. 22 is a schematic diagram illustrating a functional structure of the text generator 100 according to the embodiment. As illustrated in FIG. 22, the text generator 100 according to the embodiment further includes an utterance period information generation unit 31 and an utterance period information retaining unit 32 in addition to the structure of the first embodiment.

The utterance period information generation unit 31 generates, about sounds acquired by the acquisition unit 11, utterance period information including an utterance ID identifying a corresponding utterance, a time at which the utterance starts (hereinafter referred to as an "utterance start time"), and an utterer ID identifying the utterer who utters, and stores the generated utterance period information in the utterance period information retaining unit 32. The utterance period information retaining unit 32 is a certain storage area in the storage device provided in the text generator 100, for example. The selector 13 and the searcher 16 use the utterance period information stored in the utterance period information retaining unit 32.

The following describes basic processing performed by the text generator 100 according to the embodiment to generate text.

Processing

Figure 23:
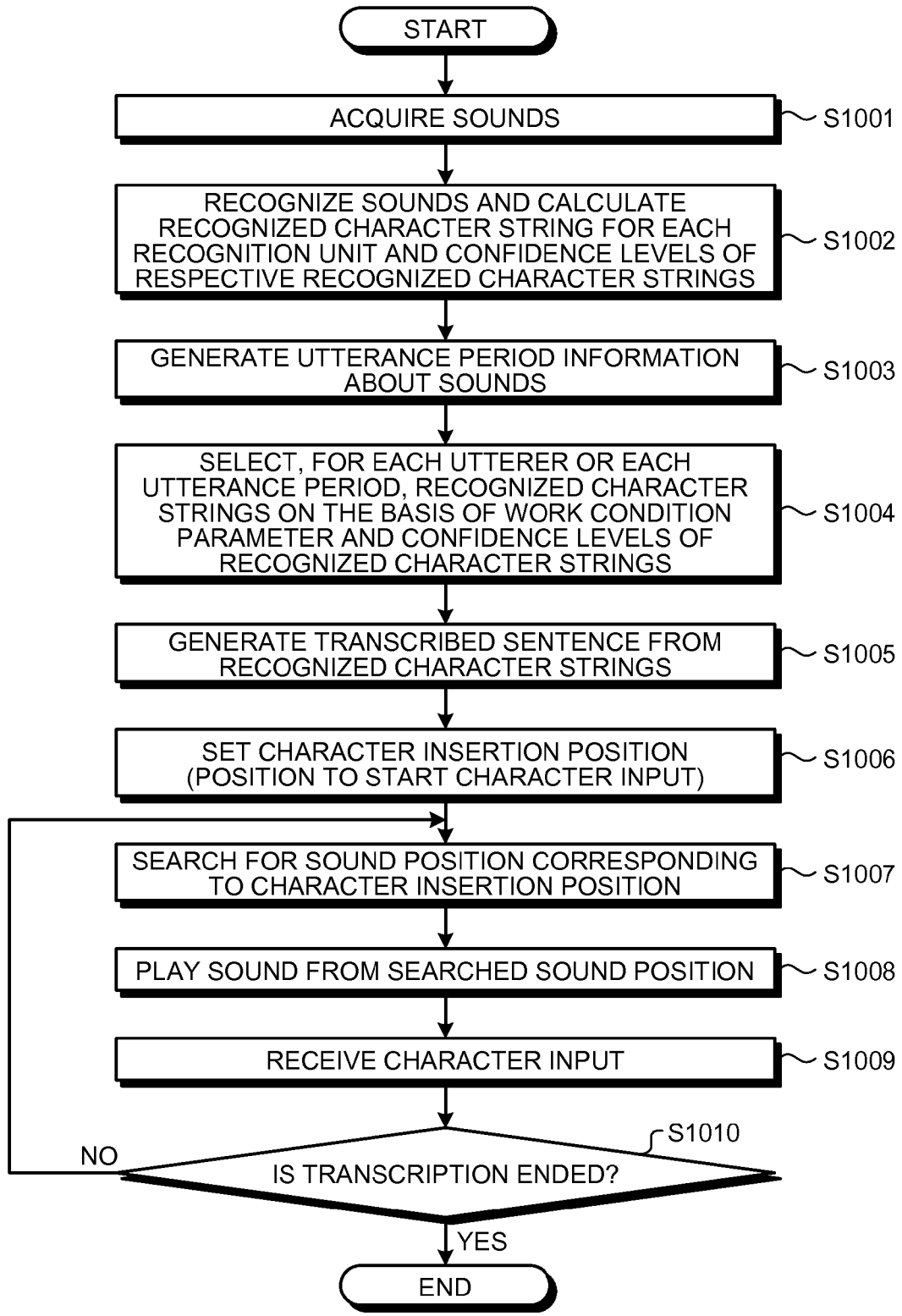
FIG. 23 is an exemplary flowchart illustrating basic processing to generate text according to the third embodiment.

FIG. 23 is a flowchart illustrating an example of basic processing to generate text according to the embodiment. As illustrated in FIG. 23, the acquisition unit 11 acquires sounds (Step S1001). The recognizer 12 recognizes the sounds acquired by the acquisition unit 11 and calculates the recognized character strings in recognition units, and the confidence levels of the recognized character strings (Step S1002). As a result, the recognized character strings and the confidence levels of the recognized character strings are stored in the recognition result retaining unit 18.

The utterance period information generation unit 31 generates the utterance period information including the utterance ID, the utterance start time, and the utterer ID for each utterance about the sounds acquired by the acquisition unit 11 (Step S1003). As a result, the utterance period information is stored in the utterance period information retaining unit 32.

The selector 13 selects at least one recognized character string used for a transcribed sentence, for each utterer or each utterance period, on the basis of the utterance period information stored in the utterance period information retaining unit 32, the various parameters about the work condition of the transcription work (work condition parameters), and the confidence levels of the recognized character strings stored in the recognition result retaining unit 18 (Step S1004). The selector 13 selects the recognized character strings used for the transcribed sentence on the basis of either a combination of the parameter about the transcription accuracy and the confidence level of the recognized character string or a combination of the parameter about the workload needed for transcription and the confidence level of the recognized character string. The generation unit 14 generates the transcribed sentence using the recognized character strings selected by the selector 13 and the recognized character strings that are not selected by the selector 13 (Step S1005).

The setting unit 15 sets the character insertion position for the operator U in the transcribed sentence corresponding to the recognized character string that is not selected by the selector 13 in accordance with the setting received from the operator U (Step S1006). The searcher 16 searches for the sound position corresponding to the character insertion position set by the setting unit 15 on the basis of the recognition results (Step S1007).

The player 17 plays a sound from the sound position searched for by the searcher 16 in accordance with the designation received from the operator U (Step S1008). Thereafter, the text generator 100 receives character input (addition or correction) from the operator U (Step S1009).

The text generator 100 according to the embodiment ends the processing when receiving an instruction to end the transcription from the operator U (Yes at S1010). The text generator 100 repeats the processing from S1007 to S1009 (No at S1010) until the instruction to end the transcription is performed by the operator U.

Details

The following mainly describes the details of the utterance period information generation unit 31 and the selector 13.

Details of Respective Functional Units

Utterance period information generation unit 31

The utterance period information generation unit 31 identifies the utterers and the utterance periods in the following manner and generates the utterance period information. The utterance period information generation unit 31 receives an identification result that the operator U identifies the utterers of the respective utterances and the utterance start times while listening to sounds, and generates the utterance period information from the received identification result, for example. The utterance period information generation unit 31 may estimate the utterers and the utterance periods using an utterer identifying technique based on an acoustic feature amount and generate the utterance period information from the estimation result.

FIG. 24 is a schematic diagram illustrating an example of data of utterance period information D3 according to the embodiment. FIG. 24 illustrates the exemplary data generated when the utterance period information generation unit 31 identifies (estimates) a plurality of utterers and the respective utterance periods from the sounds acquired by the acquisition unit 11. The utterance period information generation unit 31 generates the utterance period information D3 including the utterance IDs, the utterance start times, and the utterer IDs in this way, for example. The utterance period information generation unit 31 stores the generated utterance period information D3 in the utterance period information retaining unit 32.

Selector 13

The selector 13 selects, for each utterer or each utterance period, the recognized character strings recognized from the sounds on the basis of the utterance period information D3 generated by the utterance period information generation unit 31, the confidence levels of the recognized character strings, and the various parameters about the work condition of transcription work. More specifically, the selector 13 selects, for each utterer or utterance period, at least one recognized character string used for the transcribed sentence on the basis of the parameter about the transcription accuracy and the confidence levels of the recognized character strings. Furthermore, the selector 13 selects, for each utterer or utterance period, at least one recognized character string used for the transcribed sentence on the basis of the parameter about the workload needed for transcription and the confidence levels of the recognized character strings.

Figure 25:
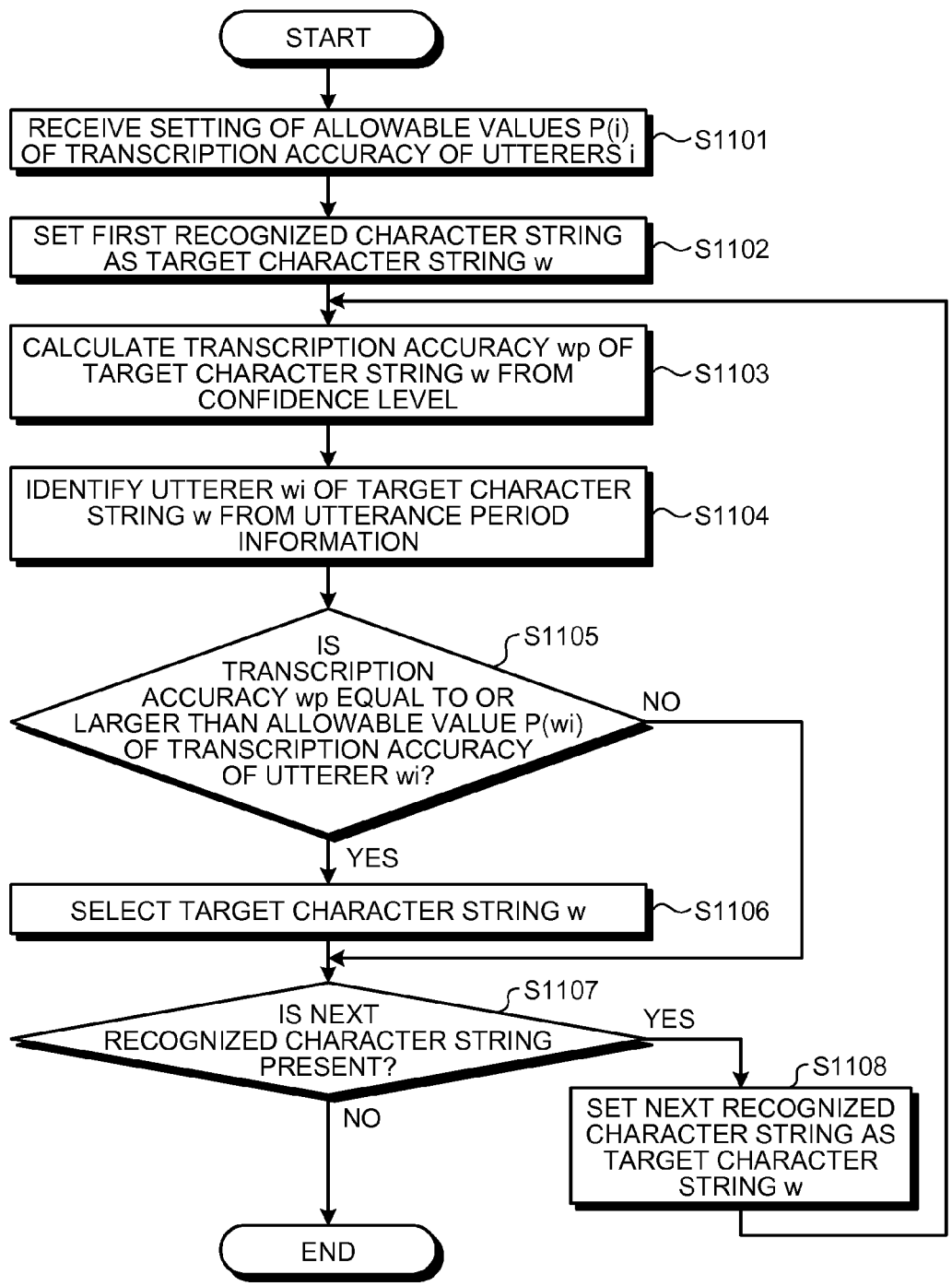
FIG. 25 is an exemplary flowchart illustrating processing to select the recognized character strings according to the third embodiment.

The following describes processing performed by the selector 13 to select the recognized character strings. FIG. 25 is a flowchart illustrating an example of the processing to select the recognized character strings according to the embodiment. FIG. 25 illustrates the exemplary processing when the selector 13 uses the allowable value of the transcription accuracy as the parameter about the transcription accuracy for each utterer.

As illustrated in FIG. 25, the selector 13 first receives the setting of the allowable values P (i) of the transcription accuracy for the utterers i (i=1 to M, and M is the number of utterers) from the operator U (Step S1101).

Figure 26:
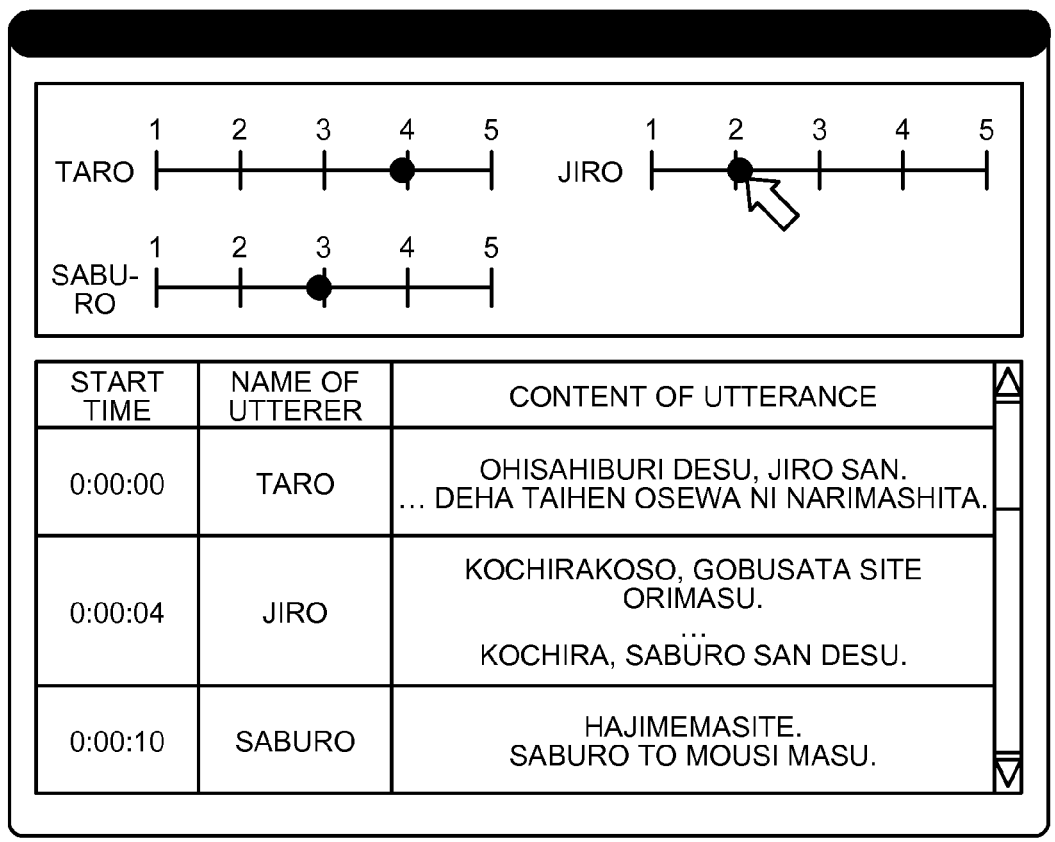
FIG. 26 is an exemplary schematic diagram illustrating the settings of the allowable value of the transcription accuracy according to the third embodiment.

FIG. 26 is a schematic diagram illustrating an example of the setting of the allowable values P (i) of the transcription accuracy according to the embodiment. As illustrated in FIG. 26, the operator U sets the allowable values P (i) of the transcription accuracy for the utters through the respective slider UIs (slide bars) that each allows one allowable step to be designated out of N steps (N=5 in FIG. 26), for example. The selector 13 displays the UIs on the screen in this way and receives the setting from the operator U.

Referring back to FIG. 25, the selector 13 then sets the first recognized character string in the recognition results obtained by the recognizer 12 (the recognition results stored in the recognition result retaining unit 18) as the target character string w (Step S1102) and then calculates the transcription accuracy wp of the target character string w from the confidence level of the target character string w (Step S1103). The selector 13 calculates the transcription accuracy wp of the target character string w by expression (1) described in the first embodiment, for example.

The selector 13 then identifies an utterer wi of the target character string w on the basis of the utterance period information D3 stored in the utterance period information retaining unit 32 (Step S1104). The selector 13 extracts an utterance period n in which the start time of the recognized character string is present between the start time of the utterance period n and the start time of the next utterance period n+1, and identifies the utterer wi from the utterer ID of the utterance period n in the utterance period information D3, for example.

The selector 13 then compares the calculated transcription accuracy wp of the target character string w with the allowable value P (wi) of the transcription accuracy of the identified utterer wi and determines whether the transcription accuracy wp is equal to or larger than the allowable value P (wi) (Step S1105). If it is determined that the transcription accuracy wp is equal to or larger than the allowable value P (wi) (Yes at S1105), the selector 13 selects the target character string w (Step S1106). If it is determined that the transcription accuracy wp is smaller than the allowable value P (wi) (No at S1105), the selector 13 does not select the target character string w.

The selector 13 then determines whether the next recognized character string is present in the recognition results obtained by the recognizer 12 (Step S1107). If it is determined that the next recognized character string is present (Yes at S1107), the selector 13 sets the next recognized character string as the target character string w (Step S1108) and repeats the processing from S1103 to S1107. If it is determined that no next recognized character string is present (No at S1107), the selector 13 ends the processing.

The selector 13 may select the recognized character string using the parameter about the workload needed for transcription for each utterer in the same manner as described above. Alternatively, the selector 13 may select the recognized character string using the parameter about the transcription accuracy for each utterance period or the parameter about the workload needed for transcription for each utterance period.

As described above, the text generator 100 according to the embodiment selects, for each utterer or each utterance period, the recognized character strings recognized from the sounds on the basis of the confidence levels of the recognized character strings and the various parameters about the work condition of the transcription work (at least one parameter of the transcription accuracy and the workload needed for transcription) designated by the operator U, and generates the transcribed sentences.

As a result, the text generator 100 according to the embodiment enables the addition or correction of characters to be readily made and the burden placed on the operator U in the transcription work to be reduced in the same manner as the first embodiment.

Text Generator

Figure 27:
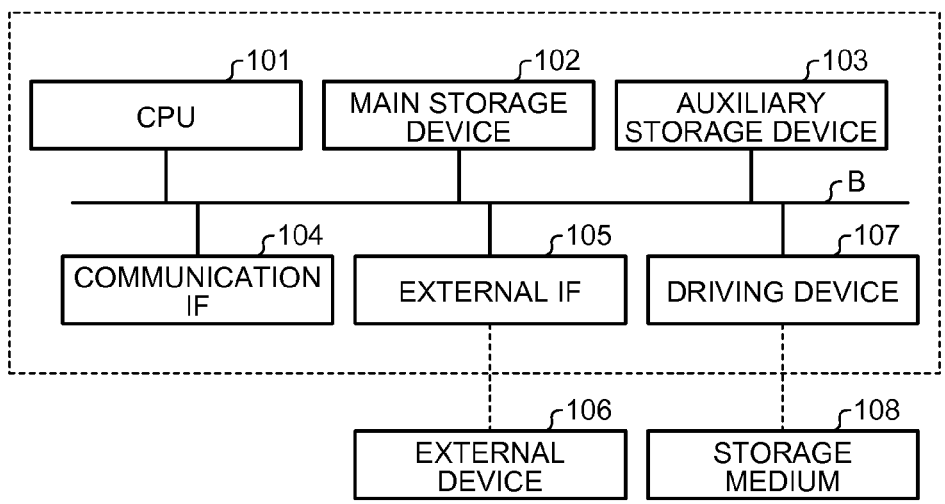
FIG. 27 is an exemplary schematic diagram illustrating a functional structure of the text generator according to the first to the third embodiments.

FIG. 27 is a schematic diagram illustrating an example of a structure of the text generator 100 according to the embodiments. As illustrated in FIG. 27, the text generator 100 according to the embodiments includes a central processing unit (CPU) 101 and a main storage device 102. The text generator 100 also includes an auxiliary storage device 103, a communication interface (IF) 104, an external IF 105, and a driving device 107. In the text generator 100, the respective devices are coupled with each other through a bus B. Thus, the text generator 100 according to the embodiments corresponds to a typical information processing apparatus.

The CPU 101 is an arithmetic processing unit that controls the text generator 100 totally and achieves the respective functions of the text generator 100. The main storage device 102 is a storage device (memory) storing programs and data in certain storage areas thereof. The main storage device 102 is a read only memory (ROM) or a random access memory (RAM), for example. The auxiliary storage device 103 is a storage device having a larger capacity storage area than that of the main storage device 102. The auxiliary storage device 103 is a nonvolatile storage device such as a hard disk drive (HDD) or a memory card, for example. The CPU 101 reads out the programs and data from the auxiliary storage device 103 to the main storage device 102 and executes them so as to control the text generator 100 totally and achieve the respective functions of the text generator 100.

The communication IF 104 is an interface that connects the text generator 100 to a data transmission line N. The communication IF 104 thus enables the text generator 100 to perform data communication with other external apparatuses (other communication processing apparatuses) coupled to the text generator 100 through the data transmission line N. The external IF 105 is an interface that enables data exchange between the text generator 100 and an external device 106. The external device 106 is a display (e.g., a "liquid crystal display") that displays various types of information such as processing results or an input device (e.g., a "numerical keypad", a "key board", or a "touch panel") that receives processing input, for example. The driving device 107 is a controller that writes data into and read out data from a storage medium 108. The storage medium 108 is a flexible disk (FD), a compact disk (CD), or a digital versatile disk (DVD), for example.

The text generation function in the embodiments is achieved by the text generator 100 executing a computer program and the resulting cooperative operation of the respective functional units described above, for example. In this case, the program is recorded in a recording medium readable by the text generator 100 (computer) in an execution environment as a file in an installable or executable format, and provided. For example, in the text generator 100, the program has a unit structure comprising the respective functional units described above and the respective units are generated on the RAM of the main storage device 102 once the CPU 101 reads out the program from the storage medium 108 and executes the program. The manner of providing the program is not limited to this manner. For example, the program may be stored in an external apparatus connected to the Internet and may be downloaded through the data transmission line N. The program may be preliminarily stored in the ROM of the main storage device 102 or the HDD of the auxiliary storage device 103 and provided. The example is described in which the text generation function is achieved by software implementation. The achievement of the text generation function, however, is not limited to this manner. A part or all of the respective functional units of the text generation function may be achieved by hardware implementation.

In the embodiments, the text generator 100 comprises a part or all of the acquisition unit 11, the recognizer 12, the selector 13, the generation unit 14, the setting unit 15, the searcher 16, the player 17, the recognition result retaining unit 18, the connecting unit 21, the recognition connection result retaining unit 22, the utterance period information generation unit 31, and the utterance period information retaining unit 32. The structure of the text generator 100, however, is not limited to this structure. The text generator 100 may be coupled to an external apparatus having a part of the functions of those functional units through the communication IF 104 and provide the text generation function by data communication with the coupled external apparatus and the resulting cooperative operation of the respective functional units. This structure enables the text generator 100 in the embodiments to be also applied to a cloud environment, for example.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A text generator, comprising a computer including hardware, the computer being configured to control the text generator to at least:
   recognize an acquired sound and obtain recognized character strings in recognition units and confidence levels of the recognized character strings;
   select at least one of the recognized character strings used for a transcribed sentence on the basis of a parameter about a work condition of a transcription work designated by an operator; and
   generate the transcribed sentence using the selected recognized character strings, wherein
   the computer is further configured to control the text generator to select the recognized character string on the basis of a combination of at least one of a parameter about transcription accuracy and a parameter about a workload needed for transcription with a confidence level of the recognized character string, and
   the computer is further configured to control the text generator to use a transcription work time as the parameter about the workload needed for transcription, calculate the transcription work time of each of the recognized character strings on the basis of the number of characters of the recognized character string, compare an accumulated work time cumulatively showing the calculated transcription work time of the recognized character strings in descending order of the confidence levels thereof with an allowable value of the transcription work time, and select the recognized character string when the accumulated work time is equal to or smaller than the allowable value.

2. A text generator, comprising a computer including hardware, the computer being configured to control the text generator to at least:
   recognize an acquired sound and obtain recognized character strings in recognition units and confidence levels of the recognized character strings;
   select at least one of the recognized character strings used for a transcribed sentence on the basis of a parameter about a work condition of a transcription work designated by an operator; and
   generate the transcribed sentence using the selected recognized character strings, wherein
   the computer is further configured to control the text generator to select the recognized character string on the basis of a combination of at least one of a parameter about transcription accuracy and a parameter about a workload needed for transcription with a confidence level of the recognized character string, and
   the computer is further configured to control the text generator to obtain a start time and an end time of each of the recognized character strings, and use a transcription work time as the parameter about the workload needed for transcription, calculate the transcription work time of each of the recognized character strings on the basis of the start time and the end time thereof, compare an accumulated work time cumulatively showing the calculated transcription work time of the recognized character strings in descending order of the confidence levels thereof with an allowable value of the transcription work time, and select the recognized character string when the accumulated work time is equal to or smaller than the allowable value.

3. A text generator, comprising a computer including hardware, the computer being configured to control the text generator to at least:
   recognize an acquired sound and obtain recognized character strings in recognition units and confidence levels of the recognized character strings;
   select at least one of the recognized character strings used for a transcribed sentence on the basis of a parameter about a work condition of a transcription work designated by an operator; and
   generate the transcribed sentence using the selected recognized character strings, wherein
   the computer is further configured to control the text generator to select the recognized character string on the basis of a combination of at least one of a parameter about transcription accuracy and a parameter about a workload needed for transcription with a confidence level of the recognized character string, and
   the computer is further configured to control the text generator to use a transcription work cost as the parameter about the workload needed for transcription, calculate a transcription work time of each of the recognized character strings on the basis of the number of characters of the recognized character string, calculate the transcription work cost of each of the recognized character strings on the basis of the calculated transcription work time and a work cost per unit time, compare an accumulated work cost cumulatively showing the calculated transcription work cost of the recognized character strings in descending order of the confidence levels thereof with an allowable value of the transcription work cost, and select the recognized character string when the accumulated work cost is equal to or smaller than the allowable value.

4. A text generator, comprising a computer including hardware, the computer being configured to control the text generator to at least:

recognize an acquired sound and obtain recognized character strings in recognition units and confidence levels of the recognized character strings;

select at least one of the recognized character strings used for a transcribed sentence on the basis of a parameter about a work condition of a transcription work designated by an operator; and generate the transcribed sentence using the selected recognized character strings, wherein the computer is further configured to control the text generator to select the recognized character string on the basis of a combination of at least one of a parameter about transcription accuracy and a parameter about a workload needed for transcription with a confidence level of the recognized character string, and the computer is further configured to control the text generator to:

obtain a start time and an end time of each of the recognized character strings, and use a transcription work cost as the parameter about the workload needed for transcription, calculate a transcription work time of each of the recognized character strings on the basis of the start time and the end time of the recognized character string, calculate the transcription work cost of each of the recognized character strings on the basis of the calculated transcription work time and a work cost per unit time, compare an accumulated work cost cumulatively showing the calculated transcription work cost of the recognized character strings in descending order of the confidence levels thereof with an allowable value of the transcription work cost, and select the recognized character string when the accumulated work cost is equal to or smaller than the allowable value.

* * * * *